(12) United States Patent
Wake et al.

(10) Patent No.: US 12,079,012 B2
(45) Date of Patent: Sep. 3, 2024

(54) DRONE SYSTEM, DRONE, STEERING DEVICE, DRONE SYSTEM CONTROL METHOD, AND DRONE SYSTEM CONTROL PROGRAM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

(*) Notice: Subject to any disclaimer, the term of this patent is extended or adjusted under 35 U.S.C. 154(b) by 764 days.

(21) Appl. No.: 15/734,245

(22) PCT Filed: Jun. 3, 2019

(86) PCT No.: PCT/JP2019/021967
§ 371 (c)(1),
(2) Date: Apr. 1, 2021

(87) PCT Pub. No.: WO2019/235418
PCT Pub. Date: Dec. 12, 2019

(65) Prior Publication Data
US 2021/0216085 A1    Jul. 15, 2021

(30) Foreign Application Priority Data

Jun. 4, 2018    (JP) .................................. 2018-106891

(51) Int. Cl.
*G05D 1/00* (2024.01)
*B64C 39/02* (2023.01)
(Continued)

(52) U.S. Cl.
CPC ........... *G05D 1/106* (2019.05); *B64C 39/024* (2013.01); *G05D 1/102* (2013.01); *G05D 1/1062* (2019.05);
(Continued)

(58) Field of Classification Search
CPC ...... G08G 5/0065; G08G 5/0069; G08G 5/04; G05D 1/106; G05D 1/102; B64C 39/024; B64U 10/13; B64U 2101/00
See application file for complete search history.

(56) References Cited

U.S. PATENT DOCUMENTS 4,313,201 A    1/1982 Fischer et al.
9,334,064 B2    5/2016 Takasaki
(Continued)

FOREIGN PATENT DOCUMENTS

CN    106155070 A    11/2016
CN    106714554 A    5/2017
(Continued)

OTHER PUBLICATIONS

Japanese Office Action received in corresponding Japanese Application No. 2020-166690 dated Aug. 5, 2021.
(Continued)

*Primary Examiner* — Hussein Elchanti
(74) *Attorney, Agent, or Firm* — Mattingly & Malur, PC

(57) ABSTRACT

A highly safe drone is provided. A remote controller and a drone are connected to each other through a network and cooperate to operate. The drone includes a flight control unit, a flight start command reception unit receiving a flight start command from a user, a drone determination unit determining a configuration of the drone itself, an external environment determination unit determining an external environment of the drone. The drone system has a plurality of states including a takeoff diagnosis state and satisfies a condition transitioning to another state. The takeoff diagnosis state includes a drone determination state where the drone determination unit determines the configuration of the drone itself and an external environment determination state where the external environment determination unit determines the external environment. The drone system makes the drone to (Continued)

takeoff after transitioning to the takeoff diagnosis state upon receiving the flight start command.

17 Claims, 12 Drawing Sheets

(51) Int. Cl.
  *G08G 5/00* (2006.01)
  *B64U 10/13* (2023.01)
  *B64U 50/19* (2023.01)
(52) U.S. Cl.
  CPC .......... *G08G 5/003* (2013.01); *G08G 5/0065* (2013.01); *G08G 5/0069* (2013.01); *B64U 10/13* (2023.01); *B64U 50/19* (2023.01); *B64U 2201/20* (2023.01)

(56) References Cited

U.S. PATENT DOCUMENTS

| | | | |
|---|---|---|---|
| 9,944,404 B1* | 4/2018 | Gentry | G07C 5/0816 |
| 10,311,739 B2 | 6/2019 | Guan et al. | |
| 10,410,291 B1* | 9/2019 | Binion | G06Q 40/08 |
| 2014/0379177 A1 | 12/2014 | Takasaki | |
| 2016/0307447 A1* | 10/2016 | Johnson | H04B 7/18506 |
| 2017/0129603 A1* | 5/2017 | Raptopoulos | G08G 5/0069 |
| 2017/0225801 A1* | 8/2017 | Bennett | B64F 1/222 |
| 2017/0233071 A1* | 8/2017 | Pilskalns | G08G 5/0021 701/2 |
| 2017/0261998 A1 | 9/2017 | Wang | |
| 2018/0096609 A1* | 4/2018 | de la Cruz | G08G 5/0043 |
| 2018/0208309 A1* | 7/2018 | Wang | B64C 25/56 |
| 2018/0244387 A1* | 8/2018 | Russell | G06V 20/13 |
| 2018/0259342 A1* | 9/2018 | Bitra | G01C 21/188 |
| 2018/0268719 A1 | 9/2018 | Guan et al. | |
| 2018/0279105 A1* | 9/2018 | Huber | H04W 4/025 |
| 2018/0290763 A1* | 10/2018 | Huang | G08G 5/003 |
| 2020/0317338 A1 | 10/2020 | Wang | |

FOREIGN PATENT DOCUMENTS

| | | |
|---|---|---|
| JP | 56-167597 A | 12/1981 |
| JP | 10-16894 A | 1/1998 |
| JP | 2001-120151 A | 5/2001 |
| JP | 2006-082774 A | 3/2006 |
| JP | 2013-203334 A | 10/2013 |
| JP | 5832352 B2 | 11/2015 |
| JP | 2017-102942 A | 6/2017 |
| JP | 2017-154545 A | 9/2017 |
| JP | 2017-163265 A | 9/2017 |
| JP | 2017-530043 A | 10/2017 |
| JP | 2018-503194 A | 2/2018 |
| JP | 6275887 B2 | 2/2018 |
| JP | 6340433 B2 | 6/2018 |
| WO | 2018/089694 A1 | 5/2018 |

OTHER PUBLICATIONS

Request for Inspection received in corresponding Japanese Application No. 2020-166690 dated Jul. 27, 2021.
Submission of Publications received in corresponding Japanese Application No. 2020-166690 dated Jun. 4, 2021.
International Search Report of PCT/JP2019/021967 dated Aug. 27, 2019.
Chinese Office Action received in corresponding Chinese Application No. 201980043859.1 dated Jun. 16, 2023.

* cited by examiner

DRONE SYSTEM, DRONE, STEERING DEVICE, DRONE SYSTEM CONTROL METHOD, AND DRONE SYSTEM CONTROL PROGRAM

TECHNICAL FIELD

The present invention relates to a drone system, an aerial vehicle (drone), in particular, a drone with improved safety, a drone system control method, and a drone system control program.

BACKGROUND ART

An application of small helicopters (multicopters) generally called drones is in progress. One of the important fields of application thereof is spraying of chemicals such as pesticides or liquid fertilizers to a farmland (a farm field) (for example, Patent Literature 1). In Japan where the farmland is smaller than in the Europe and the U.S., drones are more suitable than manned airplanes and helicopters in many cases.

Technologies such as a Quasi-Zenith Satellite System and a Real Time Kinematic-Global Positioning System (RTK-GPS) allow a drone to accurately know the absolute position of the own plane in centimeters during flight. Thus, even in the typical small and complex farmland in Japan, it is possible to fly a drone autonomously with minimum manual control and to spray chemicals efficiently and accurately.

On the other hand, in some cases, safety considerations were not sufficient for autonomous drones intended for spraying agricultural chemicals. Since a drone loaded with chemicals weighs several tens of kilograms, a case of an accident such as falling onto a person may have serious consequences. Further, the operator of a drone is usually not an expert, so therefore a foolproof mechanism is required, but the consideration for this was insufficient. Until now, there have been drone safety technologies based on human control (for example, Patent Literature 2), but there was no technology for addressing safety issues specific to autonomous drones for spraying agricultural chemicals.

CITATION LIST

Patent Literature

Patent Literature 1: JP 2001-120151 A
Patent Literature 2: JP 2017-163265 A

SUMMARY OF INVENTION

Technical Problem

A drone, such as an unmanned aerial vehicle, that is able to maintain high level of safety even during autonomous flight is provided.

Solution to Problem

In the present invention, the above-described problem is solved by providing a drone system having a remote controller and a drone, being connected to each other through a network and cooperating to operate. The drone includes a flight control unit, a flight start command reception unit receiving a flight start command from a user, a drone determination unit determining that a configuration of the drone itself is operating within a normal range, and an external environment determination unit determining that an external environment of the drone is suitable for a flight of the drone. The drone system has a plurality of states different from each other including at least a takeoff diagnosis state, and the drone system may satisfy a condition determined for each state to transition to another state corresponding the condition. The takeoff diagnosis state includes at least a drone determination state where the drone determination unit determines the configuration of the drone itself, and an external environment determination state where the external environment determination unit determines the external environment. The drone system makes the drone to takeoff after transitioning to the takeoff diagnosis state upon receiving the flight start command.

Further, the configuration that the drone determination unit determines may be configured to include at least one of a battery, a motor, and a sensor.

Further, the external environment of the drone may be configured to include at least one of presence or absence of disturbance that interferes with radio waves connecting the drone and the remote controller, GPS reception sensitivity, temperature, wind speed around the drone, weather, and geomagnetic situation.

Further, the drone may be configured to wait while landing when the external environment determination unit determines that the external environment is not suitable for the flight of the drone.

Further, the drone system may be configured to confirm a power capacity of the remote controller in the takeoff diagnosis state and to notify when the power capacity of the remote controller is less than or equal to a predetermined value.

Further, the drone system may further include an emergency remote controller transmitting an emergency stop command to the drone, and the drone system may be configured to confirm a power capacity of the emergency remote controller in the takeoff diagnosis state and notify when the power capacity of the emergency remote controller is less than or equal to a predetermined value.

Further, the drone system may be configured to transition to the drone determination state when the flight start command is received, to transition to the external environment determination state when a condition of the drone itself is determined within a normal range in the drone determination state, and to start a takeoff operation of the drone when the external environment is determined to be suitable for the flight of the drone in the external environment determination state.

Further, the drone may be configured to further include a flight plan storage unit storing an information related to a flight plan of the drone, and the plurality of states may be configured to further include a flight plan confirmation state confirming the information related to the flight plan stored in the flight plan storage unit.

Further, the drone system may be configured to transition to the drone determination state when receiving the flight start command, to transition to the flight plan confirmation state when a condition of the drone itself is determined within a normal range in the drone determination state, to transition to the external environment determination state when it is confirmed that the flight plan is stored in the flight plan storage unit in the flight plan confirmation state, and to start a takeoff operation of the drone when the external environment is determined to be suitable for the flight of the drone in the external environment determination state.

Further, the drone may be configured to further include a flight preparation unit operating during hovering of the drone, and the plurality of states may be configured to further include a hovering state in which the flight preparation unit diagnosis a condition of the drone during hovering.

Further, the hovering state may be configured to diagnose at least one of wind speed around the drone and thrusts of the drone by a propulsion device.

Further, the flight preparation unit may be configured to include a calibration unit calibrating at least one of a sensor measuring altitude of the drone and a sensor measuring speed of the drone, and the calibration unit may be configured to calibrate in the hovering state.

Further, the flight preparation unit may be configured to include a weight estimation unit estimating a weight of the drone, and the weight estimation unit may be configured to estimate the weight of the drone in the hovering state.

Further, the drone system may be configured to start a flight accompanied by a horizontal displacement of the drone after transitioning to the hovering state.

Further, the drone may be configured to include at least one of a base station position confirmation unit confirming a position of a base station being connected to each other through the drone and the network to cooperate to operate, a airframe position confirmation unit confirming a position of the drone, a nose confirmation unit confirming a direction of a nose of the drone, the periphery confirmation unit confirming whether there are obstacles around the drone, and the airframe visual confirmation unit prompting the user to visually confirm whether the drone is normal.

A method for controlling a drone system according to another aspect of the present invention may include a remote controller and a drone being connected to each other through a network and cooperating to operate. The drone may include a flight control unit, a flight start command reception unit receiving a flight start command from a user, a drone determination unit determining that a configuration of the drone itself is operating within a normal range, and an external environment determination unit determining that an external environment of the drone is suitable for a flight of the drone. The drone system may have a plurality of states different from each other including at least a takeoff diagnosis state, and the drone system may satisfy a condition determined for each state to transition to another state corresponding the condition. The takeoff diagnosis state may include at least a drone determination state where the drone determination unit determines the configuration of the drone itself, and an external environment determination state where the external environment determination unit determines the external environment. The method for controlling a drone system may include steps of receiving the flight start command, transitioning to the takeoff diagnosis state based on the flight start command, and making the drone to takeoff after transitioning to the takeoff diagnosis state.

A control program of a drone system according to another aspect of the present invention may include a remote controller and a drone being connected to each other through a network and cooperating to operate. The drone may include a flight control unit, a flight start command reception unit receiving a flight start command from a user, a drone determination unit determining that a configuration of the drone itself is operating within a normal range, and an external environment determination unit determining that an external environment of the drone is suitable for a flight of the drone. The drone system may have a plurality of states different from each other including at least a takeoff diagnosis state, and the drone system may satisfy a condition determined for each state to transition to another state corresponding the condition. The takeoff diagnosis state may include at least a drone determination state where the drone determination unit determines the configuration of the drone itself and an external environment determination state where the external environment determination unit determines the external environment. The control program of the drone system for causing a computer to execute may include instructions for receiving the flight start command, transitioning to the takeoff diagnosis state based on the flight start command, and making the drone to takeoff after transitioning to the takeoff diagnosis state.

Advantageous Effects of Invention

A drone (unmanned aerial vehicle) that is able to maintain high level of safety even during autonomous flight is provided.

DESCRIPTION OF EMBODIMENTS

Hereinafter, embodiments for carrying out the present invention will be described with reference to the drawings. All drawings are illustrations. In the following detailed description, certain details are given for illustration purposes and to facilitate a complete understanding of the disclosed embodiments. However, the embodiments are not limited to these particular details. In addition, for simplification of the drawings, well-known structures and devices are outlined.

Figure 6:
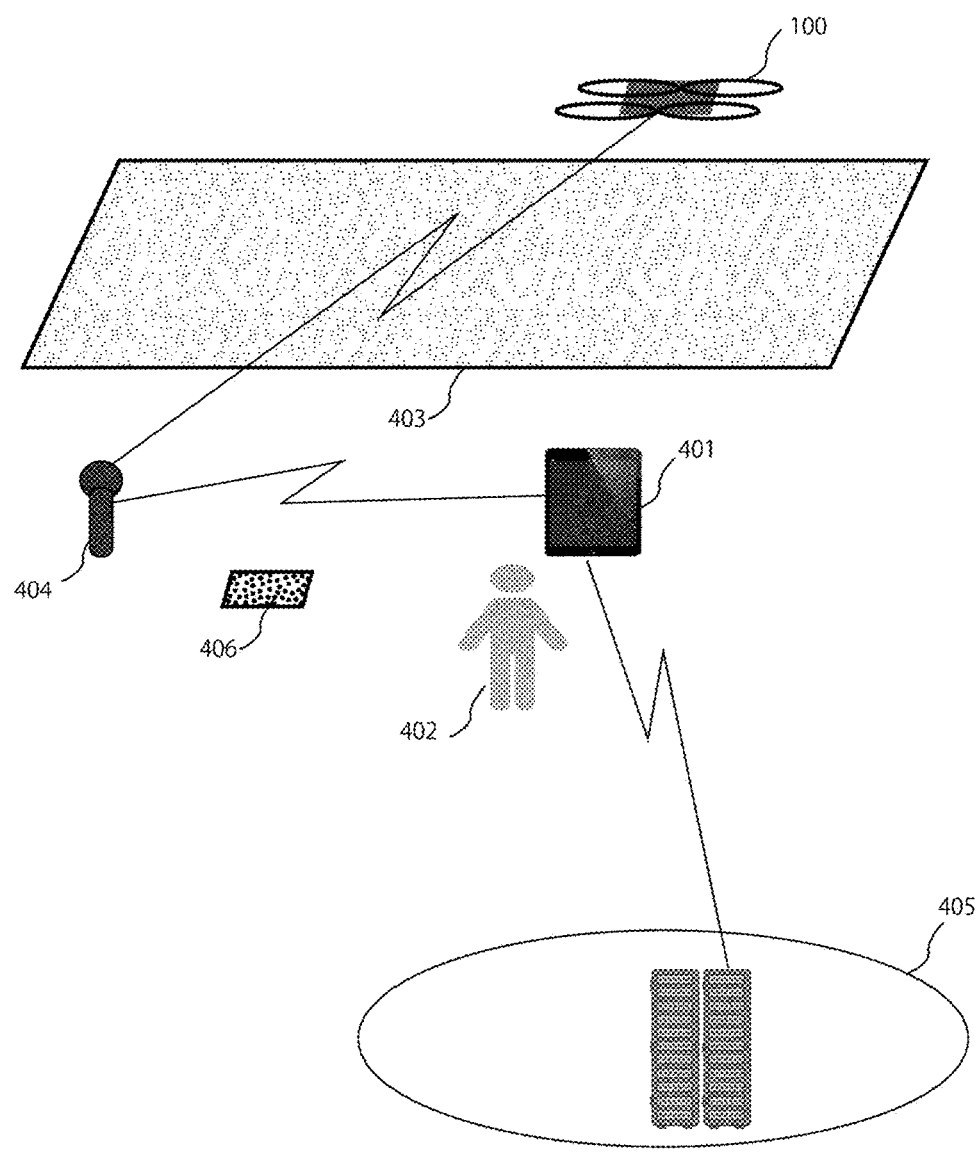
FIG. 6 is an overall conceptual view of the drone system mentioned above.

FIG. 6 illustrates an overall conceptual diagram of a system using an embodiment of a chemical spraying application of a drone 100 according to the present invention.

This drawing is a schematic view, and the scale is not accurate. As shown in this figure and FIG. 9, a drone system 500 is a system in which the drone 100, a remote controller 401, a base station 404, and a farming support cloud 405, are connected to each other through a network (NW) and operate in cooperation with each other. In the drone system 500, all components may be directly connected to each other, or each component is directly connected to at least one component and is separated via a directly connected component to be indirectly connected to another component.

The remote controller 401 has a unit for transmitting a command to the drone 100 by the operation of a user 402 and displaying information, such as a position, a chemical amount, a battery level, and a camera image, received from the drone 100. The remote controller 401 may be realized by a portable information device such as a general tablet terminal for operating a computer program. It is desirable that the drone 100 according to the present invention is controlled to perform autonomous flight. However, a manual operation is desirably performed at the time of basic operation such as take-off and return and emergency. In addition to portable information devices, an emergency operation device having an exclusive emergency stop function may be used (it is desirable that the emergency operation device is a dedicated device which is equipped with a large emergency stop button or the like so as to be able to respond quickly in case of emergency.). It is desirable for the remote controller 401 and the drone 100 to perform wireless communication by Wi-Fi or the like.

A farm field 403 is a rice field, an upland field, or the like, targeted for chemical spraying by the drone 100. Actually, the topography of the farm field 403 is complicated, and there is a case where the topographic map cannot be obtained in advance, or the topographic map and the situation of the site are inconsistent. Usually, the farm field 403 is adjacent to a house, a hospital, a school, a farm field for other crops, a road, a railroad, and the like. Further, there may also be obstacles such as buildings and electric wires in the farm field 403.

The base station 404 is a device which provides a master unit function of Wi-Fi communication and the like. The base station may also function as an RTK-GPS base station to provide the accurate position of the drone 100 (The master unit function of Wi-Fi communication and the RTK-GPS base station may be independent devices.). The farming support cloud 405 is typically a group of computers operated on a cloud service, and it is desirable that the farming support cloud 405 be wirelessly connected to the remote controller 401 via a mobile phone line or the like. The farming support cloud 405 may analyze the image of the farm field 403 photographed by the drone 100, grasp the growth state of crops, and perform processing for determining a flight route. Further, the drone 100 may be provided with the stored topographical information or the like of the farm field 403. In addition, the history of the flight of the drone 100 and photographed images may be accumulated to perform various analysis processes.

Usually, the drone 100 takes off from a landing point 406 outside the farm field 403, and returns to the landing point 406 after spraying chemicals on the farm field 403, or when it becomes necessary to replenish the chemicals or charge. A flight route (an intrusion pathway) from the landing point 406 to a target farm field 403 may be saved in advance by the farming support cloud 405 and the like, or may be entered by the user 402 before a start of takeoff.

Figure 1:
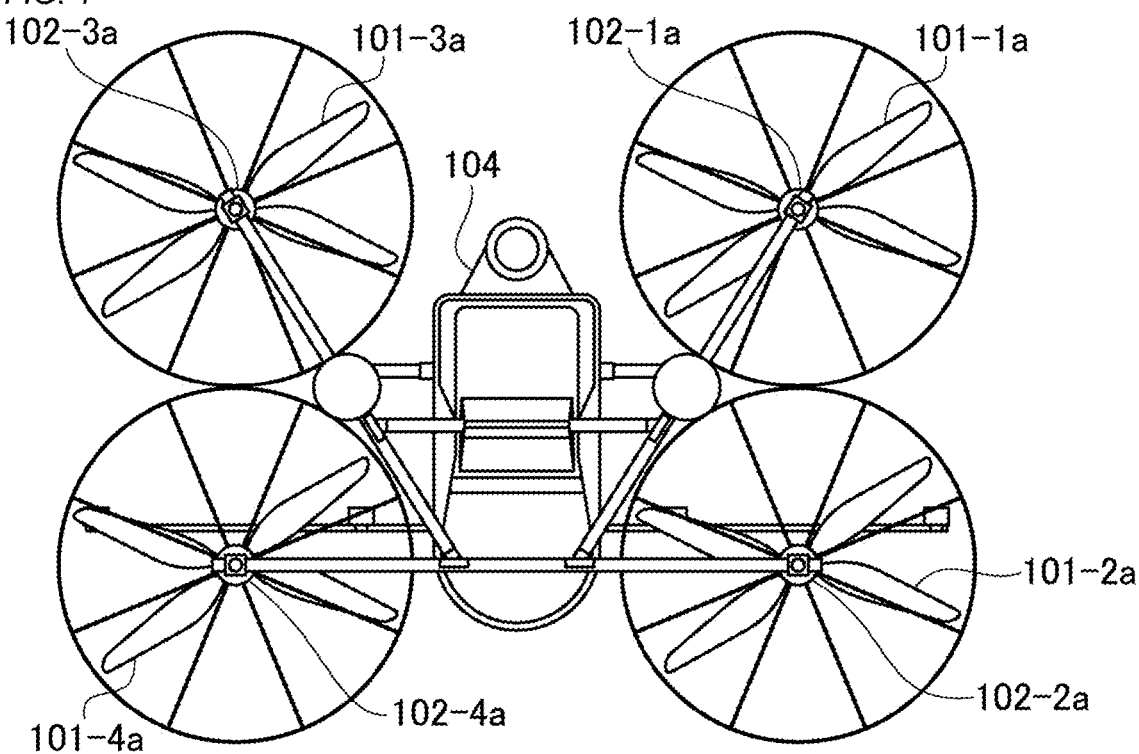
FIG. 1 is a plan view of the embodiment of the drone for configuring the drone system according to the present invention.
Figure 2:
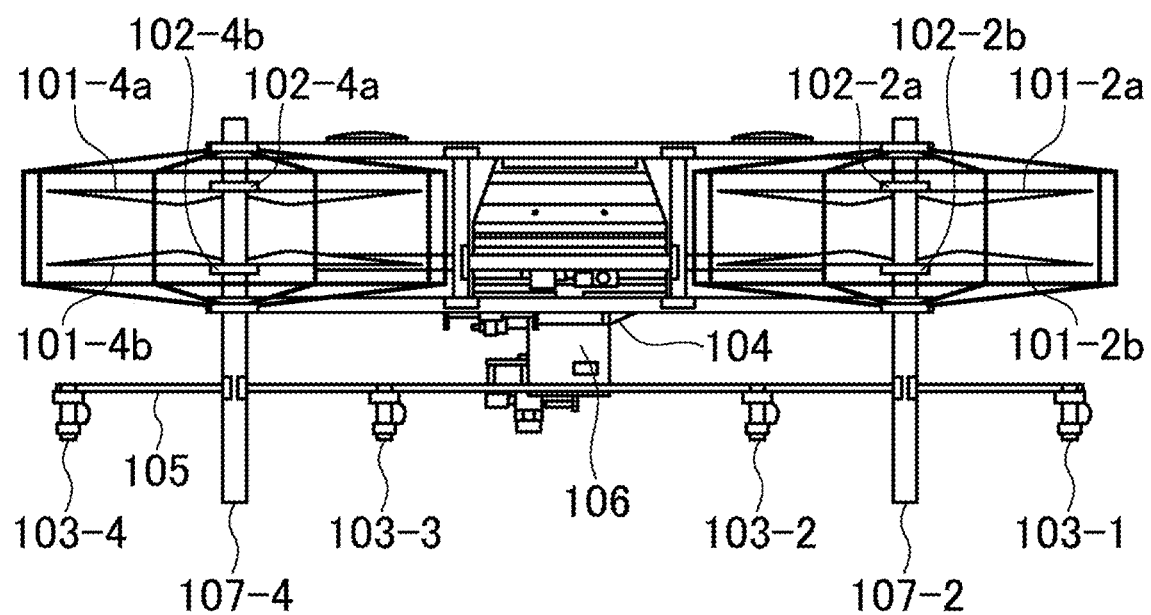
FIG. 2 is a front view of the drone mentioned above.
Figure 3:
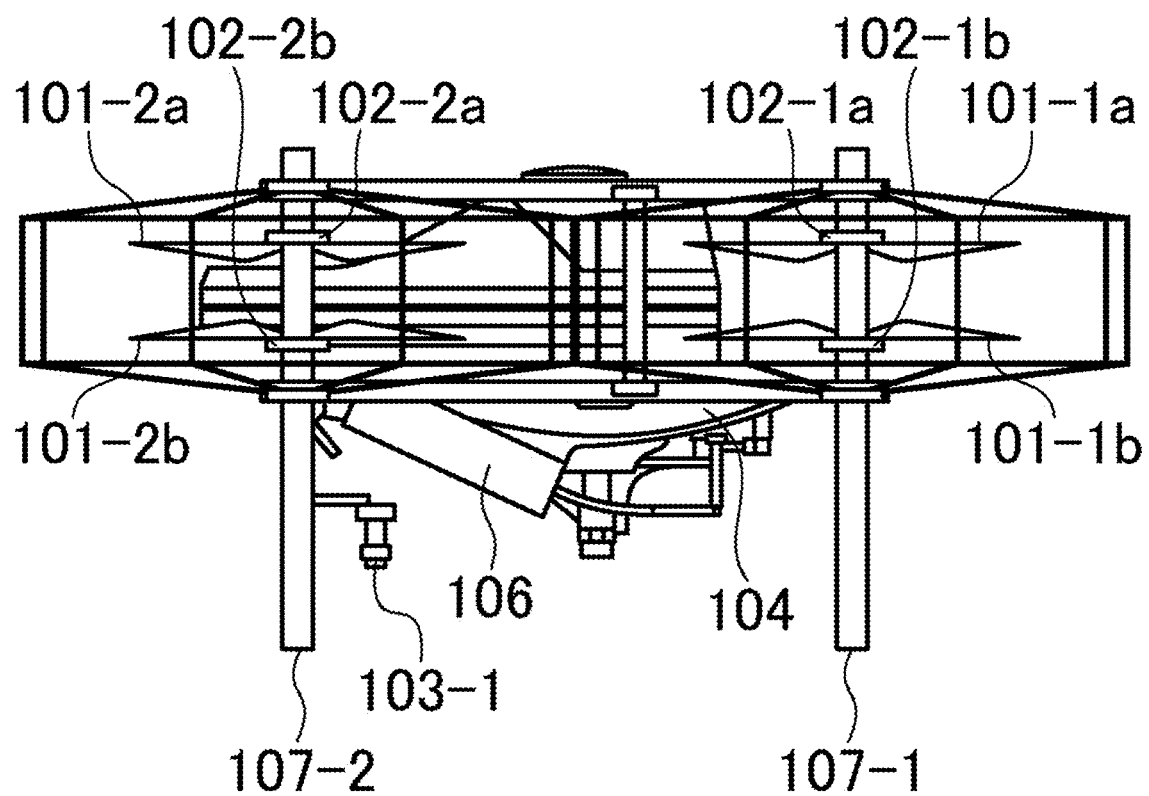
FIG. 3 is a right side view of the drone mentioned above.
Figure 4:
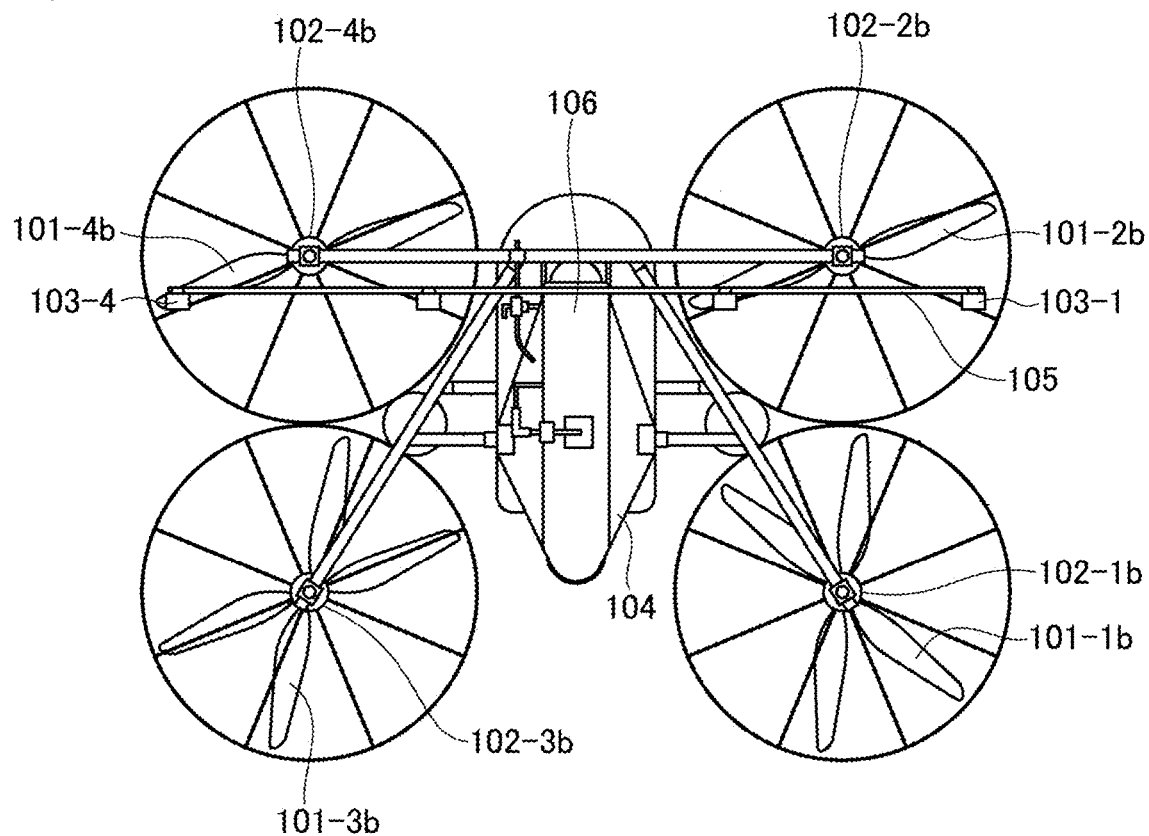
FIG. 4 is a rear view of the drone mentioned above.
Figure 5:
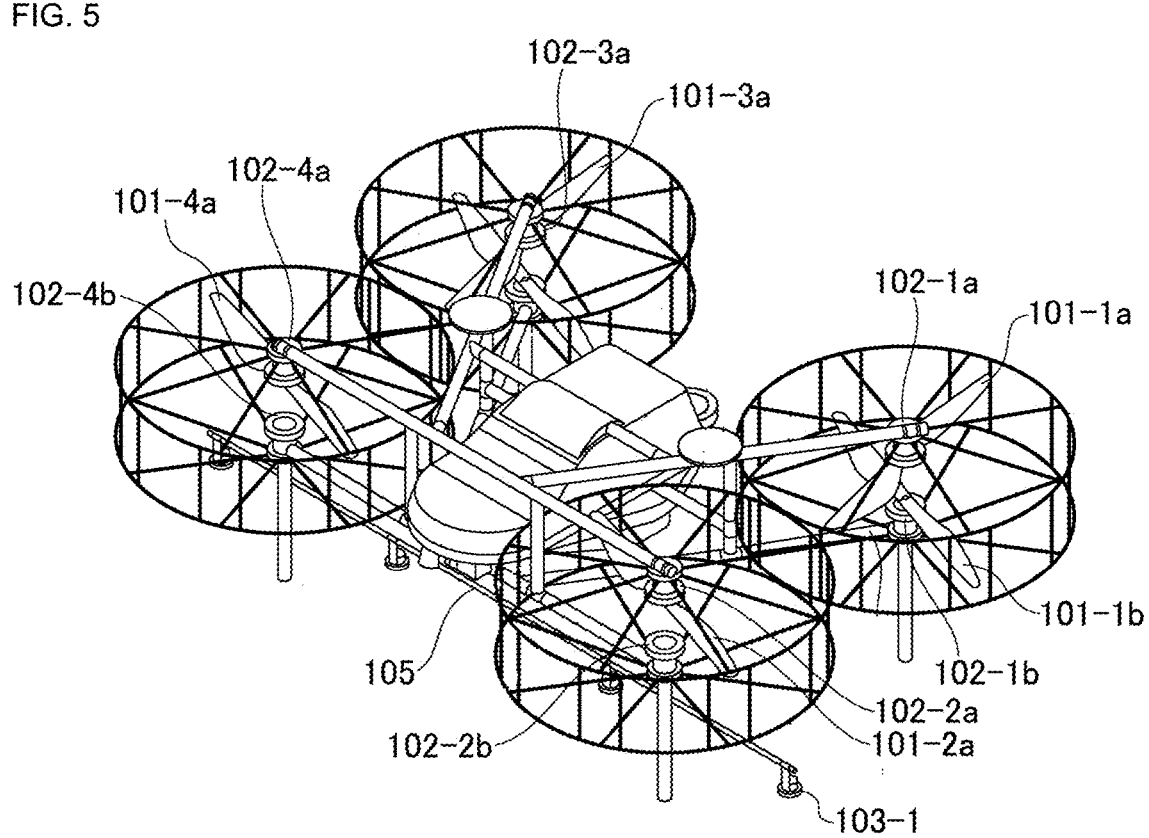
FIG. 5 is a perspective view of the drone mentioned above.

FIG. 1 is a plan view of an embodiment of the drone 100, FIG. 2 is a front view (viewed from a traveling direction side), FIG. 3 is a right side view thereof, FIG. 4 is a rear view, and FIG. 5 is a perspective view. In this description, a drone is defined as a general flight vehicle having multiple rotor blades or flight units, regardless of a power means (electric power, prime mover, or the like), an operating system (wireless or wired, autonomous or manual flight type, or the like).

Rotor blades 101-1$a$, 101-1$b$, 101-2$a$, 101-2$b$, 101-3$a$, 101-3$b$, 101-4$a$, 101-4$b$ (also called rotors) are units for flying the drone 100. It is desirable that eight rotor blades (four sets of two-stage rotor blades) are provided in consideration of the balance of flight stability, airframe size, and battery consumption.

Motors 102-1$a$, 102-1$b$, 102-2$a$, 102-2$b$, 102-3$a$, 102-3$b$, 102-4$a$, 102-4$b$ are units (which are typically an electric motor but may be a motor or the like) for rotating the rotor blades 101-1$a$, 101-1$b$, 101-2$a$, 101-2$b$, 101-3$a$, 101-3$b$, 101-4$a$, 101-4$b$, and it is desirable that one motor be installed in one rotor blade. In the upper and lower rotor blades (for example, 101-1$a$ and 101-1$b$) and the corresponding motors (for example, 102-1$a$ and 102-1$b$) in one set, desirably, axes are collinear and rotate in directions opposite to each other for the flight stability of the drone. Incidentally, although a part of the rotor blades 101-3$b$ and a part of the motors 102-3$b$ are not illustrated, their positions are obvious, and are illustrated if there is a left side view. As illustrated in FIGS. 2 and 3, desirably, a radial member for supporting a propeller guard, which is provided such that a rotor does not interfere with foreign matters, is desirably not horizontal but a roof structure. The structure promotes the buckling deformation of the member toward the rotor at the time of collision to prevent the member from interfering with the rotor.

Chemical nozzles 103-1, 103-2, 103-3, 103-4 are units for spraying chemicals downward, and four chemical nozzles are preferably provided. In this description, the chemicals are generally referred to as liquids or powders sprayed on the farm field such as pesticides, herbicides, liquid fertilizers, insecticides, seeds, and water.

A chemical tank 104 is a tank for storing chemicals to be sprayed, and is preferably provided at a position close to the center of gravity of the drone 100 and lower than the center of gravity from the viewpoint of weight balance. Chemical hoses 105-1, 105-2, 105-3, 105-4 are units for connecting the chemical tank 104 with respective chemical nozzles 103-1, 103-2, 103-3, 103-4. The chemical hoses are made of a hard material and may also serve to support the chemical nozzle. A pump 106 is a unit for discharging the chemicals from the nozzle.

The drone 100 sprays chemicals stored in the chemical tank 104 downward from an air toward the farm field. According to the drone 100, which performs aerial spraying, it is possible to spray the chemicals more densely on the farm field than when spraying from the ground by a ground sprayer or the user himself. Therefore, unlike the case where it is sprayed from the ground, it can be sprayed uniformly without being duplicated in the area in the farm field. Thus, the chemicals stored in the chemical tank 104 has a higher concentration, for example, about 10 times that of the chemicals sprayed from the ground.

Figure 7:
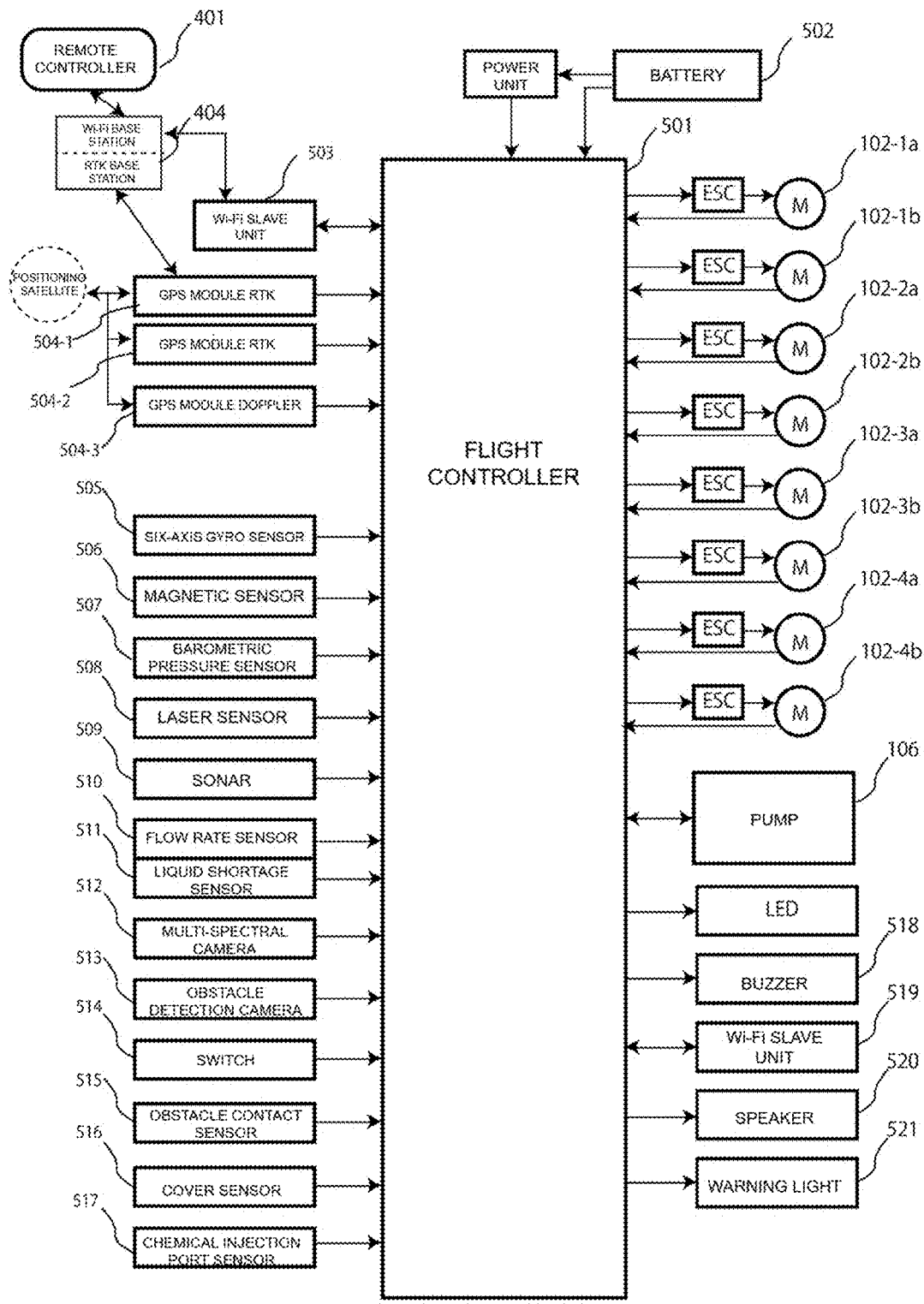
FIG. 7 is a schematic view illustrating a control function of the drone mentioned above.

FIG. 7 is a schematic diagram illustrating a control function of the embodiment of the chemical spraying drone according to the present invention. A flight controller 501 is a component which controls the entire drone, and specifically may be an embedded computer including a CPU, memory, related software, and the like. The flight controller 501 controls the flight of the drone 100 by controlling rotation speeds of the motors 102-1*a*, 102-1*b*, 102-2*a*, 102-2*b*, 102-3*a*, 102-3*b*, 104-*a*, 104-*b* with control means such as electronic speed control (ESC) on the basis of the input information received from the remote controller 401 and the input information obtained from various sensors described later. It is desirable to have a configuration that the actual rotation speed of the motors 102-1*a*, 102-1*b*, 102-2*a*, 102-2*b*, 102-3*a*, 102-3*b*, 104-*a*, 104-*b* is fed back to the flight controller 501 to monitor whether a normal rotation is performed. Alternatively, the rotor blade 101 may be provided with an optical sensor or the like so that the rotation of the rotor blade 101 is fed back to the flight controller 501.

The software used by the flight controller 501 is preferably rewritable through a storage medium or the like for function expansion/change, problem correction, or the like, or through communication means such as Wi-Fi communication or USB. In this case, it is desirable that the protection by encryption, checksum, electronic signature, virus check software, and the like prevents rewriting performed by unauthorized software. In addition, a part of a calculation process used in the control by the flight controller 501 may be executed by another computer existing on the remote controller 401, the farming support cloud 405, or another place. Since the flight controller 501 is highly important, some or all of the components thereof may be duplexed.

A battery 502 is a unit which supplies power to the flight controller 501 and other components of the drone, and is desirably rechargeable. The battery 502 is desirably connected to the flight controller 501 via a fuse or a power supply unit including a circuit breaker or the like. The battery 502 is desirably a smart battery which has a function of transmitting an internal state (such as the amount of stored electricity and accumulated usage time) of the battery to the flight controller (501) in addition to a power supply function.

Desirably, the flight controller 501 interacts with the remote controller 401 via a Wi-Fi slave unit function 503 and further via the base station 404 so as to receive a necessary instruction from the remote controller 401 and transmit necessary information to the remote controller 401. In this case, it is desirable to encrypt the communication so as to prevent illegal acts such as interception, spoofing, and hijacking of equipment. The base station 404 desirably has an RTK-GPS base station function in addition to a Wi-Fi communication function. By combining a signal from the RTK base station and a signal from a GPS positioning satellite, a GPS module 504 can measure the absolute position of the drone 100 with an accuracy of about several centimeters. Since the GPS module 504 is highly important, it is desirable to duplex and multiplex the GPS module 504. Further, in order to handle a failure of a specific GPS satellite, each of redundant GPS modules 504 is desirably controlled to use another satellite.

A six-axis gyro sensor 505 is a unit to measure an acceleration of a drone body in three axis directions orthogonal to each other (Further, it is a unit to calculate a speed by integrating the acceleration). Furthermore, the six-axis gyro sensor 505 is a unit to measure a change in an altitude angle of the drone body in the above-mentioned three axis directions, such as an angular velocity. A geomagnetic sensor 506 is a unit which measures the direction of the drone body by measuring geomagnetism. A barometric pressure sensor 507 is a unit which measures atmospheric pressure, and can indirectly measure the altitude of the drone. A laser sensor 508 is a unit which measures a distance between the drone body and a ground surface by utilizing the reflection of laser light, and desirably uses an IR (infrared) laser. A sonar 509 is a unit which measures the distance between the drone body and the ground surface by utilizing the reflection of sound waves such as ultrasonic waves. These sensors may be selected according to the cost target and performance requirements of the drone. Further, a gyro sensor (angular velocity sensor) for measuring the tilt of the airframe, a wind force sensor for measuring wind force, and the like may be added. Further, it is desirable that these sensors be duplexed or multiplexed. In a case where there are multiple sensors for the same purpose, the flight controller 501 may use only one of the sensors, and when the sensor fails, the sensor may be switched to use an alternative sensor. Alternatively, a plurality of sensors may be used at the same time, and a case where respective measurement results do not match may be considered that a failure occurs.

A flow rate sensor 510 is a unit for measuring the flow rate of the chemicals, and the flow rate sensors are desirably provided at a plurality of places on a route from the chemical tank 104 to the chemical nozzle 103. A liquid shortage sensor 511 is a sensor which detects that the amount of the chemicals is equal to or less than a predetermined amount. A multi-spectral camera 512 is a unit which photographs the farm field 403 and obtains data for image analysis. An obstacle detection camera 513 is a camera for detecting drone obstacles. The obstacle detection camera has different image characteristics and lens direction from those of the multi-spectral camera 512, so that it is desirable that the obstacle detection camera is different from the multi-spectral camera 512. A switch 514 is a unit for the user 402 of the drone 100 to make various settings. An obstacle contact sensor 515 is a sensor for detecting that the drone 100, particularly, a rotor or a propeller guard part thereof is in contact with an obstacle such as an electric wire, a building, a human body, a standing tree, a bird, or other drones. A cover sensor 516 is a sensor which detects that an operation panel of the drone 100 and a cover for internal maintenance are open. A chemical injection port sensor 517 is a sensor which detects that the injection port of the chemical tank 104 is open. These sensors may be selected according to the cost target and performance requirements of the drone and may be duplexed or multiplexed. Further, a sensor may be provided at the base station 404 outside the drone 100, the remote controller 401, or other places, and the read information may be transmitted to the drone. For example, a wind force sensor may be provided in the base station 404, and information regarding wind force and a wind direction may be transmitted to the drone 100 via Wi-Fi communication.

The flight controller 501 transmits a control signal to the pump 106 to adjust the discharging amount of the chemicals and stop the chemical discharging. It is desirable that the current state (for example, the rotation speed) of the pump 106 is fed back to the flight controller 501.

An LED 107 is a display unit for notifying a drone operator of a state of the drone. Instead of or in addition to the LED, a display unit such as a liquid crystal display may be used. A buzzer 518 is an output unit for notifying the state of the drone (particularly an error state) by an audio signal. A Wi-Fi slave unit function 519 is an optional component for communicating with an external computer or the like for the transfer of software, for example, separately from the remote controller 401. Instead of or in addition to the Wi-Fi slave unit function, another wireless communication means such as infrared communication, Bluetooth (registered trademark), ZigBee (registered trademark), and NFC or wired communication means such as USB connection may be used. A speaker 520 is an output unit for notifying the drone state (particularly an error state) by the recorded human voice, synthesized voice, or the like. Depending on the weather conditions, it may be difficult to see the visual display of the drone 100 in flight, and in such a case, it is effective to communicate the situation by voice. A warning light 521 is a display unit such as a strobe light for notifying the drone state (particularly an error state). These input/output units may be selected according to the cost target and performance requirements of the drone and may be duplexed or multiplexed.

Figure 8:
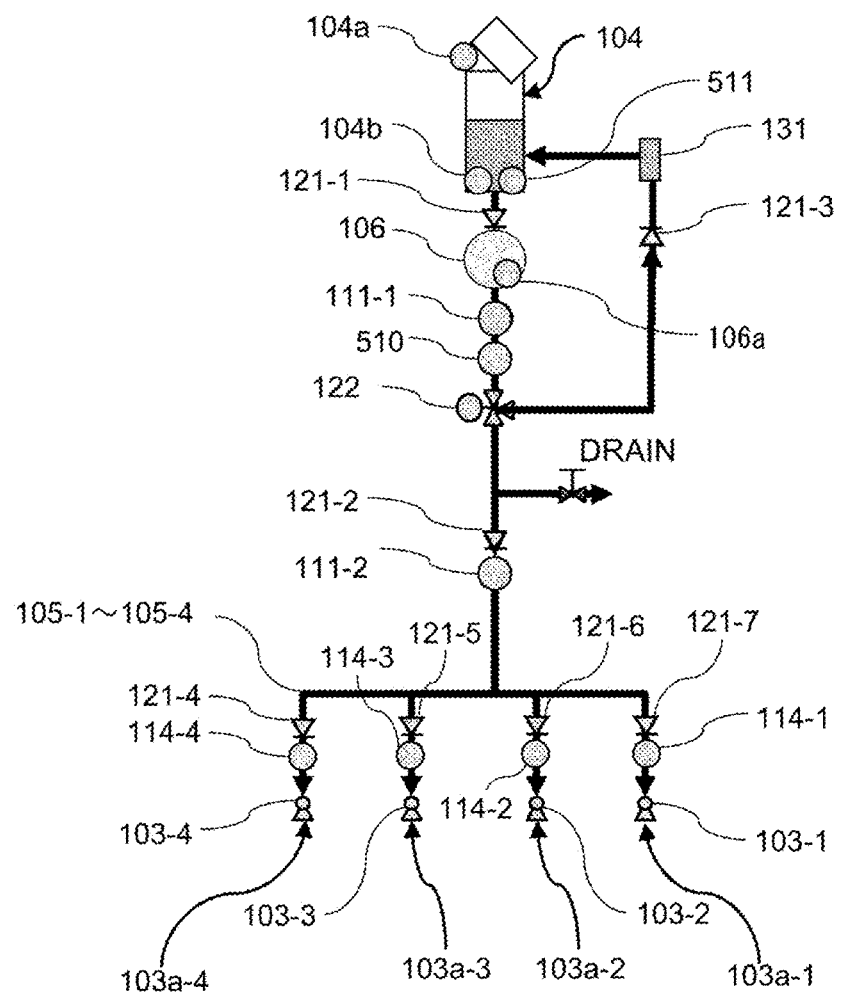
FIG. 8 is a schematic view illustrating a configuration of a chemical spraying system included in the drone mentioned above.

As illustrated in FIG. 8, a chemical discharge control system included in the drone 100 is provided in an agricultural machine for spraying chemicals, particularly in this embodiment is the drone 100 for spraying chemicals, controls the discharge of the chemicals with high accuracy, and detects abnormalities in the discharge of the chemicals.

In the present embodiment, "the abnormalities in the discharge" of the chemicals include not only a state in which an abnormality in the discharge of the chemicals has actually occurred and the chemicals exceeding a predetermined value are being discharged, but also a preparatory state in which it may cause the abnormality in the discharge of the chemicals and a setting error state in which chemicals different from the one scheduled to be sprayed is actually sprayed or may be sprayed.

As mentioned above, the chemical tank 104 is a tank storing the chemicals for spraying. This chemical tank 104 has a lid that can be opened and closed to fill the chemicals and take out the chemicals stored. An opening/closing sensor 104*a*, which is able to detect an opening/closing state, is attached on this openable lid. This opening/closing sensor 104*a* can be configured with, for example, a magnet attached to the lid and a body and a sensor device sensing a magnetic force and a contact of this magnet. As a result, an opening and closing of the lid can be determined, the user can recognize an opening/closing state of the lid and it is possible to prevent a situation in which the chemicals sprayed with the lid open.

In addition, a chemical type determination sensor 104*b* is provided with the chemical tank 104. The chemical type determination sensor 104*b* can determine a type of the chemical stored in the chemical tank 104.

This chemical type determination sensor 104*b* is configured with, for example, a device that is able to measure a viscosity and conductivity, or pH, of the chemicals in the chemical tank 104, to compare a measured value of each item with a reference value for each chemicals, and to determine the type of the chemical.

Not limited to this, for example, when a cartridge type chemical tank is used as the chemical tank 104, an IC or the like that records data of chemical types is attached to the cartridge type chemical tank to provide a way to acquire the data of the chemical types from the IC and the like so that it is possible to determine the chemical types.

Here, since multiple types of chemicals may be used, it is useful to determine whether the chemical to be sprayed is stored in the chemical tank 104. In particular, a particle size of the chemical differs depending on a type, and if a chemical with a smaller particle size than the chemical planned to be sprayed is accidentally sprayed, a drift (scattering and adhesion of the chemicals to other than a target object) is likely to occur and cannot be overlooked.

Further, a liquid shortage sensor 511 for detecting a liquid shortage of the chemical is attached to the chemical tank 104. The liquid shortage of the chemical includes a case where an amount of the chemical becomes a predetermined amount other than a case where the chemical runs out, and the liquid shortage of the chemicals can be detected in response to an arbitrarily set amount.

It is advisable to provide the chemical tank 104 with a function for detecting an evaporation of the chemicals in the chemical tank 104 and a function for measuring temperature and humidity so that the chemicals can be managed in an appropriate condition.

The pump 106 discharges the chemical stored in the chemical tank 104 to a downstream and sends out to each chemical nozzles 103-1, 103-2, 103-3, 103-4, via the chemical hoses 105-1, 105-2, 105-3, 105-4.

The chemical is sent out from the chemical tank 104 to the chemical nozzles 103-1, 103-2, 103-3, 103-4, and a direction where the chemical is sent out along this sending route may be called "a downstream direction" and a direction opposite to this may be called "an upstream direction" in the description of the present embodiment.

The expansion tank 131 is a tank that temporarily stores the chemical sent out from the three-way valve 122 and sends back to the chemical tank 104.

A route from the three-way valve 122 to the chemical tank 104 via the expansion tank 131 is a route for removing (defoaming) air bubbles in water or the chemical injected into the chemical tank 104. By circulating this route and temporarily storing in the expansion tank 131, the water or the chemical can be defoamed.

Check valves 121-1, 121-2, 121-3, 121-4, 121-5, 121-6, 121-7 send out the chemical only in one direction and are valves to prevent inflow to an opposite direction, that is, backflow. The check valves 121-1, 121-2, 121-3, 121-4, 121-5, 121-6, 121-7 play a role of a blocking mechanism that blocks the discharge of the chemical in the route from the chemical tank 104 to the chemical nozzles 103-1, 103-2, 103-3, 103-4, and another mechanism, such as a solenoid valve, can be used as the blocking mechanism if it can play a role for blocking the discharge of the chemicals.

In this embodiment, the check valve 121-1 is provided between the chemical tank 104 and the pump 106, near a chemical outlet provided in the chemical tank 104; the check valve 121-2 is provided between the three-way valve 122 and the chemical nozzles 103-1, 103-2, 103-3, 103-4; the check valves 121-4, 121-5, 121-6, 121-7 are provided at the outlets 103*a*-1, 103*a*-2, 103*a*-3, 103*a*-4 for discharging the chemical to the outside; and the check valve 121-3 is provided between the three-way valve 122 and the expansion tank 131. The check valve 121-1 sends out the chemical delivered from the chemical tank 104 in the downstream direction and controls to prevent a backflow to the chemical tank 104. Further, the check valve 121-2 sends out the chemical delivered from the pump 106 in the downstream direction and controls to prevent a backflow to the pump 106. In addition, the check valve 121-3 sends out the chemical delivered from the three-way valve 122 in the upstream direction where the expansion tank 131 is located and controls to prevent a backflow to the three-way valve 122. Furthermore, the check valves 121-4, 121-5, 121-6, 121-7 can block the chemicals to discharge from outlets 103*a*-1, 103*a*-2, 103*a*-3, 103*a*-4 to the outside.

For the check valves 121-1, 121-2, 121-3, 121-4, 121-5, 121-6, 121-7, various types such as a swing type, a lift type, and a wafer type, can be used, and it is not limited to a specific one. Further, regardless of this embodiment, more check valves than in this embodiment may be provided at appropriate locations.

The three-way valve 122 is provided between the pump 106 and the chemical nozzles 103-1, 103-2, 103-3, 103-4, configures a branch point of the route from the pump 106 to the chemical nozzles 103-1, 103-2, 103-3, 103-4 and the route from the pump 106 to the chemical tank 104 via the expansion tank 131, and sends out the chemical to each route according to a switching operation. The three-way valve 122 is, for example, a three-way solenoid valve. Here, the route from the pump 106 to the chemical nozzles 103-1, 103-2, 103-3, 103-4 is a route for discharging the chemical from the chemical nozzles 103-1, 103-2, 103-3, 103-4 and spraying the chemical. As described above, the route from the pump 106 to the chemical tank 104 via the expansion tank 131 is a route for removing (defoaming) air bubbles in the chemical.

The flow rate sensor 510 is provided between the pump 106 and the chemical nozzles 103-1, 103-2, 103-3, 103-4 and measures a flow rate of the chemical sent out to the chemical nozzles 103-1, 103-2, 103-3, 103-4. Based on the flow rate of the chemical measured by this flow rate sensor 510, an amount of the chemical sprayed to the farm field 403 can be recognized.

The pressure sensors 111-1, 111-2 are provided at the chemical outlet and measure discharge pressures of the chemical discharged from the chemical nozzles 103-1, 103-2, 103-3, 103-4 to outside. The pressure sensors 111-1, 111-2 are provided on the downstream side of the pump 106 and measure the discharge pressure of the chemical discharged to downstream. By measuring the discharge pressure of the chemical with these pressure sensors 111-1, 111-2, it is possible to accurately recognize a discharging state of the chemical, determine a discharge abnormality such as excessive discharge of the chemical, and control the discharge of the chemical, based on the discharge pressure of the chemical obtained from each of the pressure sensors 111-1, 111-2 and/or a value of a pressure loss calculated from a measured value of each of the pressure sensors 111-1, 111-2.

In the pump 106, a pump sensor 106a measures a rotation speed of a rotor that takes in the chemical from the chemical tank 104 and discharges it to downstream. By measuring the rotation speed of the rotor of the pump 106 with this pump sensor 106a, the amount of the chemical sent out by the pump 106 can be grasped, discharge abnormalities such as excessive discharge of the chemical can be determined, and the discharge of the chemical can be controlled.

Nozzle type determination sensors 114-1, 114-2, 114-3, 114-4 can determine a type of the chemical nozzles 103-1, 103-2, 103-3, 103-4 attached to the chemical outlet. Due to the difference in particle size of each chemical to be sprayed, the chemical nozzles 103-1, 103-2, 103-3, 103-4 are usually different depending on the chemicals. Therefore, by determining whether the types of the chemical nozzles 103-1, 103-2, 103-3, 103-4 are appropriate, it is possible to prevent mistakes to spray wrong chemicals.

Specifically, for example, the outlet is provided with a fitting or engaging mechanism with the chemical nozzles 103-1, 103-2, 103-3, 103-4, and the chemical nozzles 103-1, 103-2, 103-3, 103-4 are provided with fitting or engaging mechanisms with the fitting or engaging mechanism in the outlet side and are provided with different shapes of the mechanisms for each of a plurality of the chemical nozzles 103-1, 103-2, 103-3, 103-4. Then, types of the chemical nozzles 103-1, 103-2, 103-3, 103-4 can be determined by identifying different shapes for each of the chemical nozzles 103-1, 103-2, 103-3, 103-4 when the chemical nozzles 103-1, 103-2, 103-3, 103-4 are attached to the outlet.

In a middle of the route from the chemical tank 104 to the chemical nozzles 103-1, 103-2, 103-3, 103-4, a discharge port with a cock (indicated as "DRAIN" in FIG. 8) for discharging the chemical stored in the route is provided. When the chemical stored in the route from the chemical tank 104 to the chemical nozzles 103-1, 103-2, 103-3, 103-4 is discharged after the chemical has been sprayed on the farm field 403, the chemical can be discharged from this discharge port.

In a process of refilling the chemical to the chemical tank 104, particularly in a water injection standby state (S31) and an air bleeding standby state (S32) described later, water is injected into the chemical tank 104. Each sensor related to the chemicals, such as the liquid shortage sensor 511, pressure sensors 111-1, 111-2, and the flow rate sensor 510, included in a chemical discharging system, works in the same way even if water is in the chemical tank 104. In addition, the chemical type determination sensor 104b can determine that water is in the chemical tank 104.

The drone system 500, where the drone 100, the remote controller 401, the base station 404, and the farming support cloud 405 are connected to each other and cooperate to operate, is desirable to retain a state of the drone system 500 and to continue operations as a drone system smoothly even if one of the components is disconnected from other components or a power of one of the components is turned off.

Further, for the drone 100 to start flying safely, the drone 100 itself and an external environment of the drone 100 are needed to be in a suitable condition for the flight of the drone 100. The drone system 500 is desirable to be a system that does not allow the drone 100 to fly if the drone 100 itself and the external environment is not suitable for the flight of the drone 100.

The drone system 500 has a plurality of states different from each other. By satisfying a condition determined for each state, the drone system 500 transitions to another state corresponding to the condition.

A "state of the drone system 500" is a concept indicating that conditions to transition to another state are different from each other, and each state may be configured independent from each other in terms of a software system configuration, or a plurality of states may be configured in the same system configuration. The drone system 500 performs an operation predetermined for each state when it belongs to a certain state. If conditions predetermined for each state are not met, the drone system 500 remains in that state. In addition, there may be a plurality of defined conditions, and there may be a state in which a plurality of states can be transitioned.

If an abnormality occurs in any one of the drone 100, the remote controller 401, the base station 404, and the farming support cloud 405, a safety of the drone system 500 as a whole may be jeopardized. By correctly judging the state of the drone system 500 and stipulating the operation according to the judgment, the drone 100 does not fly or spray the chemicals if the conditions are not met. In other words, the drone system 500 can be operated safely. In particular, the drone 100 can be flown safely and can spray the chemicals.

Configurations for State Transition of the Drone System

Figure 9:
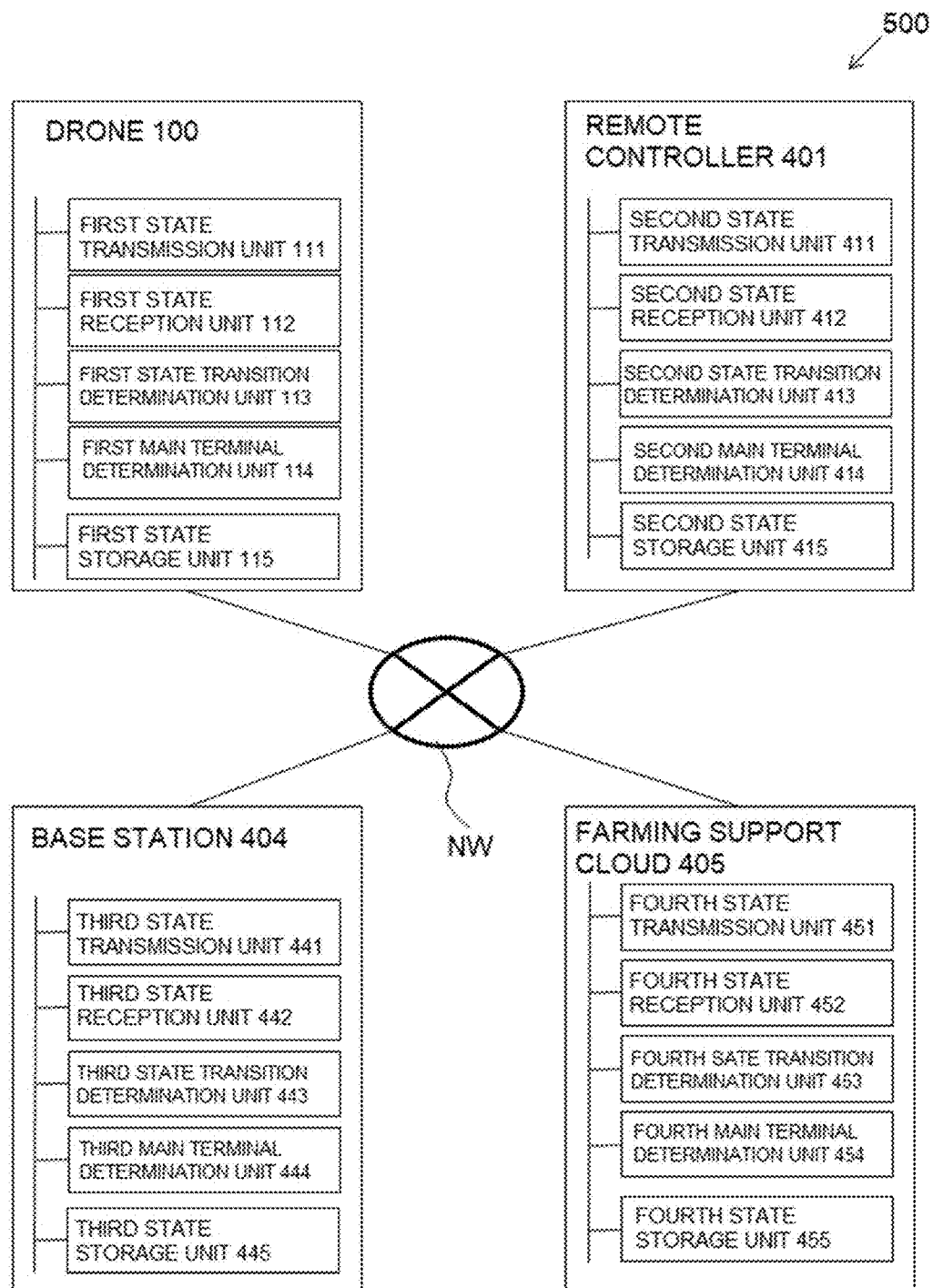
FIG. 9 is a functional block diagram illustrating a functional unit related to a state transition included in each of the drone mentioned above, a remote controller, a base station, and a farming support cloud, which are components of the drone system mentioned above.

As illustrated in FIG. 9, the drone 100 has a first state transmission unit 111, a first state reception unit 112, a first state transition determination unit 11, a first main terminal determination unit 114, and a first state storage unit 115. Further, the remote controller 401, the base station 404, and the farming support cloud 405 respectively have configurations corresponding to the first state transmission unit 111, the first state reception unit 112, the first state transition determination unit 113, the first main terminal determination unit 114, and the first state storage unit 115. In other words, the remote controller 401 has a second state transmission unit 411, a second state reception unit 412, a second state transition determination unit 413, a second main terminal determination unit 414, and a second state storage unit 415.

The base station 404 has a third state transmission unit 441, a third state reception unit 442, a third state transition determination unit 443, a third main terminal determination unit 444, and a third state storage unit 445. The farming support cloud 405 has a fourth state transmission unit 451, a fourth state reception unit 452, a fourth state transition determination unit 453, a fourth main terminal determination unit 454, and a fourth state storage unit 455.

The first to fourth state transmission units 111, 411, 441, 451 are functional units to transmit an information of the state that the drone system 500 currently belongs and a terminal information indicating the state of each terminal of the drone 100, the remote controller 401, and the base station 404, to other components connected. The other components are the drone 100, the remote controller 401, the base station 404, or the farming support cloud 405, here. The terminal information, for example, is a power on/off information and a numerical value indicating power capacity and the like of each of the drone 100, the remote controller 401, and the base station 404. Further, the terminal information may include a connection state between each components, an operation history and a maintenance history of each components, failure information of each components, an information on whether an emergency stop is in progress, a history of the emergency stop, and types of water or chemicals injected into the chemical tank 104 and its amount and an injection history.

The first to fourth state transmission units 111, 411, 441, 451 may further transmit a cloud information indicating a state of the farming support cloud 405 to the other components. The cloud information, for example, may include a history of updated information stored in the farming support cloud 405, such as an information of a last updated time and an updated terminal.

The first to fourth state reception units 112, 412, 442, 452 are functional units to receive the information of the state that the drone system 500 currently belongs and a terminal information indicating the state of each terminal of the drone 100, the remote controller 401, and the base station 404, from the first to fourth state transmission units 111, 411, 441, 451 which are included in other connected components. In addition, the first to fourth state reception units 112, 412, 442, 452 may further receive the cloud information from the other components.

In other words, the base station 404 transmits the state that the drone system 500 currently belongs to at least one of the drone 100 and the remote controller 401. Further, the base station 404 receives the state that the drone system 500 currently belongs from at least one of the drone 100 and the remote controller 401. The base station 404 receives at least one of connection states, such as a connection state of the remote controller 401 and the base station 404, a connection state of the drone 100 and the base station 404, and a connection state of the remote controller 401 and the drone 100, from at least one of the drone 100 and the remote controller 401.

Further, the base station 404 may transmit and receive the connection state between each components and the farming support cloud 405 to and from at least one of the other components.

According to the first to fourth state transmission units 111, 411, 441, 451 and the first to fourth state reception units 112, 412, 442, 452, each component can recognize each other's terminal information and cloud information of other components connected in the drone system 500. In other words, each component can maintain the state of the drone system 500 and smoothly continue the operation as the drone system 500 even if any of the components is out of cooperation.

Further, according to the configuration in which the remote controller 401 constantly recognizes the terminal information and the cloud information, the user 402 can recognize the state of the drone system 500.

The first to fourth state transition determination units 113, 413, 443, 453 are functional units to recognize the state that the drone system 500 currently belongs and determine whether the conditions for transitioning from the current state to another state are satisfied. The first to fourth state transition determination units 113, 413, 443, 453 can make decisions about the same conditions, and each state transition determination units can operate as an alternative to the other state transition determination units.

The first to fourth state transition determination units 113, 413, 443, 453 selectively decide whether conditions for transitioning to another state are satisfied. In other words, one of the state transition determination unit makes a decision, the other state transition determination units make no decision. In the following description, the component having the state transition determination unit that determines the state transition is also referred to as a "main terminal". According to this configuration, even if one of the components is turned off or the connection between the components is disconnected and the main terminal cannot operate, another component can decide the state transition as the main terminal and change the state of the drone system 500.

The first to fourth main terminal determination units 114, 414, 444, 454 are functional units to determine which component is the main terminal based on the information received by the first to fourth state reception units 112, 412, 442, 452. Priorities are set in advance as to which component becomes the main terminal, or which of the first to fourth transition determination unit 111, 411, 441, 451 determines the state transition. Specifically, when the power of each component is turned on and all the components are cooperated, the drone 100 becomes the main terminal. When the drone 100 is powered off or disconnected from each component of the drone 100 and cannot operate as a main terminal, the remote controller 401 becomes the main terminal by a decision of the first to fourth main terminal determination units 114, 414, 444, 454. The priorities are examples, and when the drone 100 cannot operate as the main terminal, the base station 404 or the farming support cloud 405 can be the main terminal. In addition, the priorities can be fixed or varied. For example, the priorities may be varied depending on the state that the drone system 500 currently belongs.

In the present embodiment, the main terminal determination unit is provided for each component. According to this configuration, the main terminal can be determined even when the connection of any component is disconnected and the cooperation is lost. When all the components are cooperating to operate with each other, it is sufficient that any one of the main terminal determination units determines the main terminal. For example, the first main terminal determination unit 114 provided in the drone 100 may determine that the drone 100 will be the main terminal. When the drone 100 lost cooperation, the second main terminal determination unit 414 determines that the remote controller 401 will be the main terminal based on that information.

The first to fourth state storage units 115, 415, 445, 455 are functional units storing the terminal information indicating the state that the drone system 500 currently belongs, and the state of the drone 100, the remote controller 401, and the base station 404. the first state storage unit 115 may further store the cloud information indicating the state of the farming support cloud 405.

The first to fourth state storage units 115, 415, 445, 455 are at least partially configured with non-volatile storage areas, such as non-volatile memories. According to this configuration, information can be stored even when the power of each component is turned off. Since the failure information and maintenance history are taken over even when the power is turned on again, repairs and maintenance can be reliably performed even if a failure or abnormality occurs before the power is turned off, and the drone system 500 can be used safely.

Configuration to Manage Chemical Injection

Figure 10:
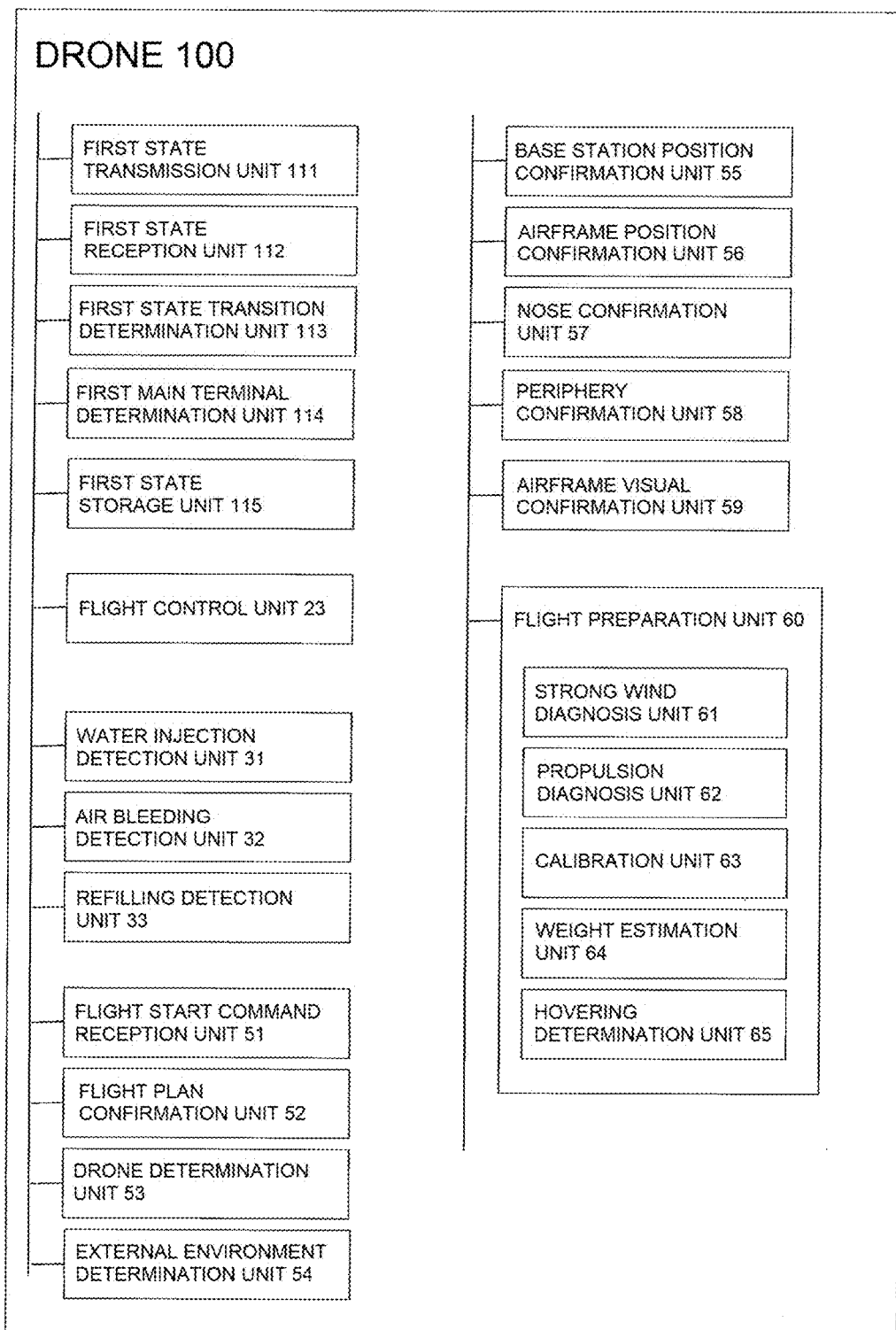
FIG. 10 is a detailed functional block diagram of the drone mentioned above.

As illustrated in FIG. 10, the drone 100 includes a water injection detection unit 31, an air bleeding detection unit 32, and a refilling detection unit 33, as a configuration for managing chemical injection to the chemical tank 104.

The water injection detection unit 31 is a functional unit that detects that water injection has been completed in the chemical tank 104.

The air bleeding detection unit 32 is a functional unit to detect that the air bleeding operation, which causes the air in the chemical tank 104 to flow out of the chemical tank 104, has been completed. The air bleeding detection unit 32 detects that the air bleeding is completed in a route from the chemical tank 104 to the three-way valve 122 in FIG. 6 (hereinafter, it is also referred to as an "upstream route") when the three-way valve opens the route on the expansion tank 131 side. The air bleeding detection unit 32 detects that the air bleeding is completed in a route from the three-way valve 122 to the chemical nozzles 103-1 to 4 in FIG. 6 (hereinafter, it is also referred to as a "downstream route") when the three-way valve 122 opens the route on the chemical nozzles 103-1 to 4 side.

In the detection of the air bleeding in the upstream route, the air bleeding detection unit 32 detects that the air bleeding operation has been completed based on the rotation speed of the pump 106 detected by the pump sensor 106*a* and at least one of measurement results of the pressure sensor 111-1 and the flow rate sensor 510. In the downstream route, specifically, the air bleeding detection unit 32 stores at least one of a value of the pressure sensor 111-1 and a value of the flow rate sensor 510 in accordance with the rotation speed of the pump 106 as a reference value when the air bleeding operation is completed. The air bleeding detection unit 32 compares the reference value according to the rotation speed of the pump 106 with the measured value of at least one of the pressure and the flow rate. If the difference is within a predetermined range, the air bleeding detection unit 32 detects that the air bleeding operation has been completed.

In the detection of the air bleeding in the downstream route, the air bleeding detection unit 32 detects that the air bleeding operation has been completed based on the rotation speed of the pump 106 detected by the pump sensor 106*a* and at least one of measurement results of the pressure sensor 111-2 and the flow rate sensor 510. The air bleeding detection unit 32 stores at least one of a value of the pressure sensor 111-2 and the value of the flow rate sensor 510 in accordance with the rotation speed of the pump 106 as the reference value when the air bleeding operation is completed, and compares it with the measured value to detect that the air bleeding operation has been completed. Further, the value of the pressure sensor 111-1 may be used for the detection of the air bleeding in the downstream.

Depending on the routes opened by the three-way valve 122, the values of the pressure sensors 111-1, 111-2 according to the rotation speed of the pump 106 and the value of the flow rate sensor 510 are respectively different. The air bleeding detection unit 32 determines the reference value to be compared with the measured value based on the information on which route the three-way valve 122 opens.

The refilling detection unit 33 is a functional unit detecting that the chemical tank 104 has been refilled with the chemicals. The refilling detection unit 33, for example, can detect that a certain amount of chemicals is in the chemical tank 104 by having a determination device to detect liquid level, weight, and the like. In addition, the refilling detection unit 33 may be a functional unit to determine the amount of the chemicals in software-based way by using a liquid level gauge, a weigh scale, or a water pressure sensor, measuring the amount of the chemicals in the chemical tank 104.

Configuration for Takeoff Diagnosis

As illustrated in FIG. 10, the drone 100 includes a flight start command reception unit 51, a flight plan confirmation unit 52, a drone determination unit 53, an external environment determination unit 54, a base station position confirmation unit 55, an airframe position confirmation unit 56, a nose confirmation unit 57, a periphery confirmation unit 58, and an airframe visual confirmation unit 59, as a configuration for diagnosing whether the drone 100 can fly safely and the conditions for spraying the chemicals are met before takeoff.

The flight start command reception unit 51 is a functional unit that receives a flight start command input by the user 402. The flight start command is a command transmitted from the remote controller 401 to the drone 100. Since the flight start command is a command for transmitting the intention of the user 402 to the drone 100, it is transmitted to the drone 100 starting from the action of the user 402.

The base station position confirmation unit 55 is a functional unit that confirms whether the position of the base station 404 connected to the drone 100 is within a predetermined range.

The airframe position confirmation unit 56 is a functional unit that confirms whether the drone 100 is located at the landing point 406.

The nose confirmation unit 57 is a functional unit that confirms whether the nose of the drone 100 is oriented in the normal direction. "The nose is oriented in the normal direction" means that, for example, the nose is oriented in the direction of the farm field where the chemical solution is sprayed.

The periphery confirmation unit 58 is a functional unit that determines whether there are obstacles such as people or objects around the drone 100 within a predetermined range around the drone 100. The peripheral confirmation unit 58, for example, may be a functional unit that prompts the user 402 to confirm the presence or absence of obstacles around the drone 100 by notification and display by the drone 100 or the remote controller 401. After confirming the area around the drone 100, the user 402 inputs that if there are no obstacles. In addition, the user 402 removes obstacles as appropriate when they are found. The input of the confirmation result of the surroundings by the user 402 may be input to the drone 100 or may be input via the remote controller 401.

In addition, the peripheral confirmation unit 58 may be a functional unit to detect obstacles around the drone 100 and automatically determine that there are no objects within the predetermined range by using an appropriate camera or a sensor loaded on the drone 100. The camera may be, for example, a 360-degree camera capable of photographing the periphery of the drone 100 at 360 degrees, or may be composed of a plurality of cameras capable of photographing different directions from each other. The sensor is, for example, an infrared sensor.

The airframe visual confirmation unit 59 is a functional unit that prompts the user 402 to visually confirm the drone 100 and allows the user 402 to enter the confirmation result. The airframe visual confirmation unit 59 prompts the user 402 to confirm the presence or absence of obstacles around the drone 100 by notifying and displaying the drone 100 or the remote controller 401. After visually confirming the drone 100, the user 402 inputs the fact if no abnormality is found. In addition, if the abnormality is found, the user 402 will repair it as appropriate. The input of the confirmation result of the surroundings by the user 402 may be input to the drone 100 or may be input via the remote controller 401.

The airframe visual confirmation unit 59 may notify the user 402 of the points of visual confirmation, etc. through the remote controller 401. By specifically indicating the points of visual confirmation, the user 402 can efficiently inspect the drone 100.

The flight plan confirmation unit 52 is a functional unit confirming whether the drone 100 has an information about the flight plan of the drone 100 normally. The flight plan includes, for example, a location of the farm field where the chemical is sprayed during flight and a flight route within the farm field. The flight plan is an information registered in advance in the flight plan storage unit of the drone 100 and can be overwritten as appropriate. In addition, the flight route included in the flight plan is automatically calculated based on the predetermined position of the farm field. The flight route may be uniquely computed based on the position of the farm field, or may be a different flight route computed each time the flight plan is drawn up in consideration of other conditions.

The drone determination unit 53 is a functional unit that determines that each configuration of the drone 100 itself is operating within the normal range. The each configuration of the drone 100 itself is, for example, the battery 502, the motor 102, various sensors, and the like.

The external environment determination unit 54 is mainly a functional unit that determines whether the external environment of the drone 100 is suitable for the flight of the drone 100. The external environment includes, for example, a presence or an absence of disturbances that interfere with the radio waves connecting each component, GPS reception sensitivity, temperature, wind speed around the drone 100, weather, and geomagnetic conditions. When the wind speed around the drone 100 is above a predetermined level, the drone 100 will be blown by the wind, the sprayed chemicals will scatter, and it becomes difficult to fly properly. In addition, if there is a chance of rainfall or snowfall, or if it is predicted that the precipitation phenomenon is likely to occur within a predetermined time, the chemicals will be carried away due to the precipitation and it will be difficult to stay in the farm field, so it is preferable not to spray. In other words, takeoff may be prohibited even when there is precipitation or there is a high possibility of precipitation within a predetermined time. Further, when the geomagnetism is disturbed, takeoff may be prohibited because it interferes with the radio waves connecting each component. Furthermore, the number of satellites for which GPS communication has been established may be counted and takeoff may be prohibited if the number is less than a predetermined number. The predetermined number may be, for example, five. If the number of satellites for which the GPS communication has been established is less and the number of satellites that can communicate during flight further decreases, measurement by the GPS may become impossible. Therefore, the external environment determination unit 54 notifies to the user 402 a reason why it is waiting without taking off.

Configurations for Diagnosing During Hovering

The drone 100 also has a flight preparation unit 60, which determines if the drone 100 is in a suitable flight situation when the drone 100 is hovering. The flight preparation unit 60 makes a diagnosis, especially during the hovering that the drone 100 takes off immediately after takeoff, but may make the diagnosis during the hovering that takes place as appropriate after the drone 100 takes off and starts flight.

The flight preparation unit 60 includes a strong wind diagnosis unit 61, a propulsion diagnosis unit 62, a calibration unit 63, a weight estimation unit 64, and a hovering determination unit 65.

The hovering determination unit 65 is a functional unit that determines whether the drone 100 is hovering, such as a hovering determination. Hovering means that the XYZ coordinates of the drone 100 do not change or are within a narrow predetermined range when the X and Y coordinates that are orthogonal to each other on the horizontal plane and the vertical Z coordinates that are orthogonal to the XY plane are defined. Further, the hovering is a state in which there is no moving speed in any of XYZ directions.

The hovering determination unit 65 detects, for example, that the positioning coordinates of RTK-GPS does not change in all directions in the XYZ directions. In addition, the hovering determination unit 65 calculates the position by second-order integration of the measured values of the six-axis gyro sensor 505 in the XYZ directions, and detects that the position in the XYZ directions does not change for a predetermined time. Furthermore, the hovering determination unit 65 integrates each of the measured values of the six-axis gyro sensor 505 in the XYZ directions to calculate the velocity, and detects that the drone 100 has no velocity in the XYZ directions. The hovering determination unit 65 determines that the drone 100 is hovering by combining any or more of the above acquired values.

The strong wind diagnosis unit 61 is a functional unit that measures the wind blowing on the drone 100 and diagnoses whether the drone 100 can fly. The measurement of wind by the strong wind diagnosis unit 61 may be calculated by, for example, measuring the stress generated by the wind with a contact detector, or by using an anemometer such as a cup style or a vane style.

The strong wind diagnosis unit 61 calculates the altitude angle of the drone 100 by the six-axis gyro sensor 505 while the drone 100 is hovering. When the wind is blowing on the drone 100, the altitude angle is tilted forward according to the strength of the wind. Therefore, when the altitude angle of the drone 100 is equal to or greater than a predetermined angle, the strong wind diagnosis unit 61 determines that the drone 100 is being blown by a wind of a predetermined strength or higher.

The strong wind diagnosis unit 61 may respectively calculate rotation speed of the motors 102-1a, 102-1b, 102-2a, 102-2b, 102-3a, 102-3b, 102-4a, 102-4b or the rotors 101-1a, 101-1b, 101-2a, 101-2b, 101-3a, 101-3b, 101-4a, 101-4b. When the wind blows on the drone 100, a force tends to lean to a downwind side against the drone 100, so a thrust of the rotor blades arranged at two locations, of the eight rotor blades 101, on the downwind side increases, or in other words, the rotation speed increases, and the thrust of the rotor blades arranged at two locations on the upwind side decreases, or in other words, the rotation speed decreases. Therefore, if the difference between the rotation speeds of the motor 102 or the rotor blade 101 due to the arrangement position is greater than or equal to a predetermined value, the strong wind diagnosis unit 61 determines that the drone 100 is being blown by a wind that is stronger than a predetermined strength. The strong wind diagnosis unit 61 detects a strong wind by either the above-mentioned determination based on the altitude angle, the determination based on the difference in the rotation speed, or a combination of both determination results.

The strong wind diagnosis unit 61 may receive information about the wind by communicating with the base station 404 and the drone 100, flying around, to determine whether the drone 100 can fly.

When the wind blowing on the drone 100 is stronger than predetermined, the strong wind diagnosis unit 61 notifies the drone system 500 as such. The state transition determination unit of the main terminal makes the state of the drone system 500 stand by as it is in the hovering state. In addition, the state transition determination unit of the main terminal may transit the state of the drone system 500 to the flight start standby state (S4) described later and land the drone 100.

The propulsion diagnosis unit 62 is a functional unit that measures a thrust that causes the drone 100 to fly during the flight to diagnose whether the thrust of the drone is exerted normally. In this embodiment, the thrust is brought by the rotor blades 101. The propulsion diagnosis unit 62 refers to, for example, a rotation measurement function arranged inside of the motor itself that controls the rotation of the rotor blade 101. In other words, by measuring the rotation speed of the motor, the thrust measuring unit 244 acquires the rotation speed of the rotor blade 101 controlled by the motor.

Further, the propulsion diagnosis unit 62 may measure the rotation speed of the rotor blade 101 itself. For example, the propulsion diagnosis unit 62 may be a non-contact tachometer. In this case, the propulsion diagnosis unit 62 counts the rotation speed of the rotor blade 101 by irradiating at least one place of the rotor blades 101 with a laser and measuring the reflected light from the rotor blade 101 of the laser. The laser is, for example, an infrared laser.

Further, the propulsion diagnosis unit 62 may measure the current supplied to the motor.

The propulsion diagnosis unit 62 may be a functional unit that measures the operating state of a propulsion unit when the thrust of the drone is achieved by a configuration other than the rotor blades. For example, when the drone is propelled by a jet injection, the propulsion diagnosis unit 62 may be a functional unit that measures the pressure of the jet injection.

The propulsion diagnosis unit 62 compares the measured thrust with the command value by the flight controller 501, and determines that the thrust is exerted properly if a difference after a certain period of time from a command from the flight controller 501 is within a predetermined threshold value. If the difference exceeds the threshold value, the propulsion diagnosis unit 62 notifies the drone system 500 accordingly. The state transition determination unit of the main terminal transitions the state of the drone system 500 to the flight start standby state (S4) described later, and lands the drone 100.

The calibration unit 63 calibrates at least one of a sensor for measuring the altitude of the drone 100 and a sensor for measuring the speed of the drone 100. A calibration of the sensor includes a zero offset of the sensor and a calibration for correcting a deviation of a gain when a value of the measurement result is high. The calibration with the calibration unit 63 is particularly performed while the drone 100 is hovering.

The sensor for measuring the altitude of the drone 100 includes, for example, the laser sensor 508, the sonar 509, the six-axis gyro sensor 505, or the GPS module RTK 504-1, 504-2. In other words, the calibration unit 63 can calibrate the laser sensor 508, the sonar 509, the six-axis gyro sensor 505, or the GPS modules RTK 504-1, 504-2 for advanced calibration.

When the sensors to be calibrated are the laser sensor 508 and the sonar 509, a difference between positioning coordinates in a height direction of the RTK-GPS in contact with the ground, such as Z coordinates, and Z coordinates in a height direction of the RTK-GPS while it is determined to be hovering is a true value of a ground altitude, and the calibration unit 63 calibrates the laser sensor 508 and the sonar 509.

When the sensor to be calibrated is the six-axis gyro sensor 505, an altitude obtained by the laser sensor 508 and the sonar 509 while it is determined to be hovering is the true value of the ground altitude, and the calibration unit 63 calibrates the six-axis gyro sensor 505.

When the sensor to be calibrated is the GPS modules RTK 504-1, 504-2, the altitude obtained by the laser sensor 508 and the sonar 509 when it is determined to be hovering is the true value of the ground altitude, and the calibration unit 63 calibrates the positioning coordinates in the Z-direction of the RTK-GPS by the GPS modules RTK 504-1, 504-2.

Sensors for measuring the speed of the drone include, for example, THE GPS MODULE DOPPLER 504-3 or the six-axis gyro sensor 505. The calibration unit 63 measures a moving speed of the drone 100 using THE GPS MODULE DOPPLER 504-3. Since the drone 100 does not move in the hovering state after takeoff and the moving speed is 0 in the XYZ directions, the calibration unit 63 calibrates the measurement result of THE GPS MODULE DOPPLER 504-3 so that the moving speed becomes 0 in the XYZ directions when it is determined to be hovering. In addition, the calibration unit 63 measures the moving speed of the drone 100 using the first-order integral value of a measured value by the acceleration sensor. In this case, the calibration unit 63 calibrates the measured value in the XY directions of the acceleration sensor so that the moving speed in the XYZ directions when it is determined to be hovering becomes 0.

The weight estimation unit 64 is a functional unit that estimates the weight of the drone 100. The weight estimation unit 64 can estimate the weight of the drone 100 while hovering, based on the thrust value measured by the propulsion diagnosis unit 62.

State Transition of Drone System

Figure 11:
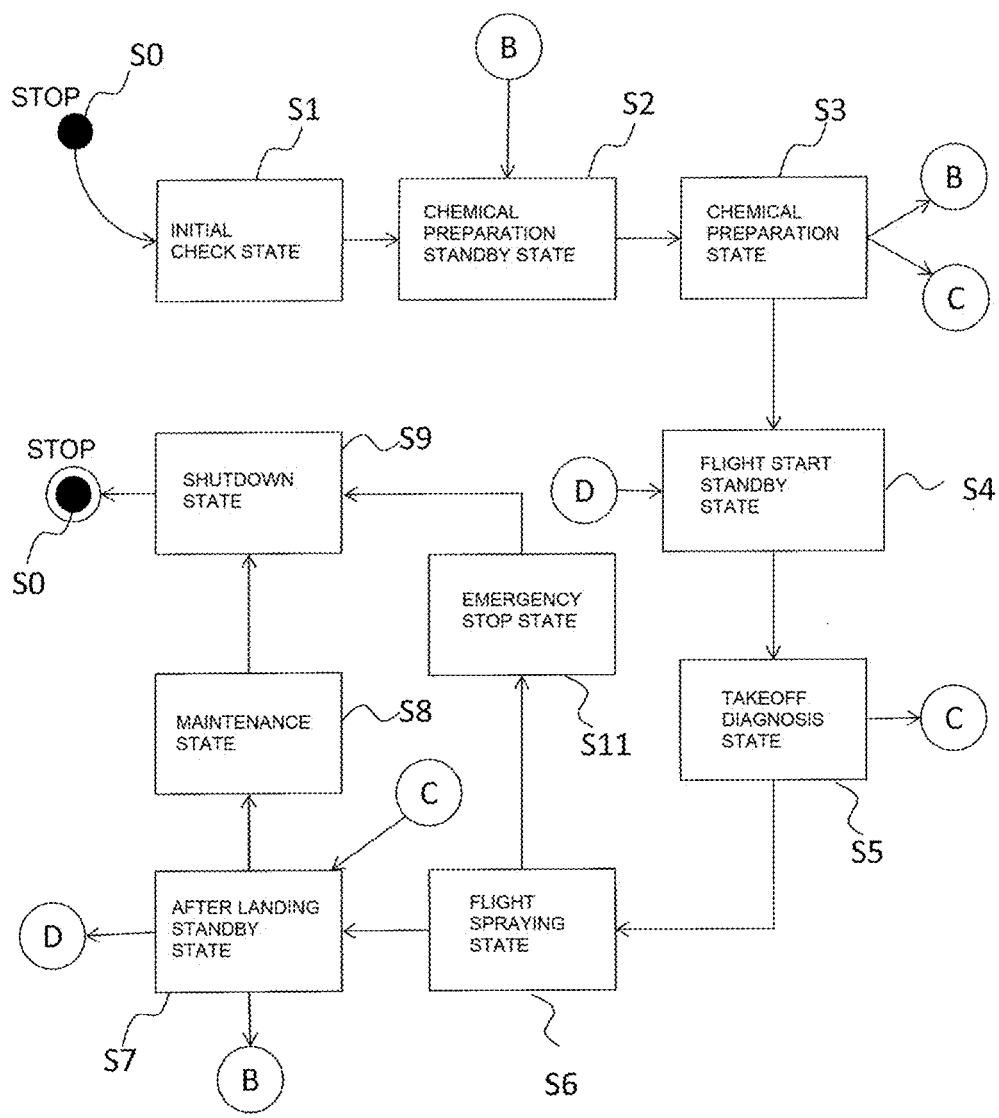
FIG. 11 is a schematic state transition diagram illustrating a plurality of states in which the drone system mentioned above transitions.

As illustrated in FIG. 11, the drone system 500 in the present embodiment includes a stop state (S0), an initial check state (S1), a chemical preparation standby state (S2), a chemical preparation state (S3), a flight start standby state (S4), a takeoff diagnosis state (S5), a flight spraying state (S6), an after landing standby state (S7), a maintenance state (S8), and a shutdown state (S9).

The stop state (S0) is a state in which the drone 100, the remote controller 401, and the base station 404 are turned off. When each component is powered on at the stop state (S0), the drone system 500 transitions to the initial check state (S1). The power of each component may be manually turned on by the user 402, or other components may be powered on when the user 402 manipulates one component. For example, it may be configured that powers of the drone and the base station 505 are turned on when the user 402 powers on the remote controller 401 and launches a dedicated application.

The initial check state (S1) is a state to check whether the operation of each component is performed normally after each component is started. In the initial check state, for example, it is confirmed whether each component is turned on, and whether a communication between each component is normally performed. When it is confirmed that all the predetermined confirmation items are normal, the drone system 500 transitions to the chemical preparation standby state (S2).

The chemical preparation standby state (S2) is waiting for the command, such as a chemical injection start command, from the user 402 to start injecting the chemicals into the chemical tank 104 of the drone 100. When the drone system 500 receives the chemical injection start command entered by the user 402, the drone system 500 transitions to the chemical preparation state (S3).

The chemical preparation state (S3) is a state to which the drone system 500 belongs while the user 402 is injecting the chemicals into the chemical tank 104.

Figure 12:
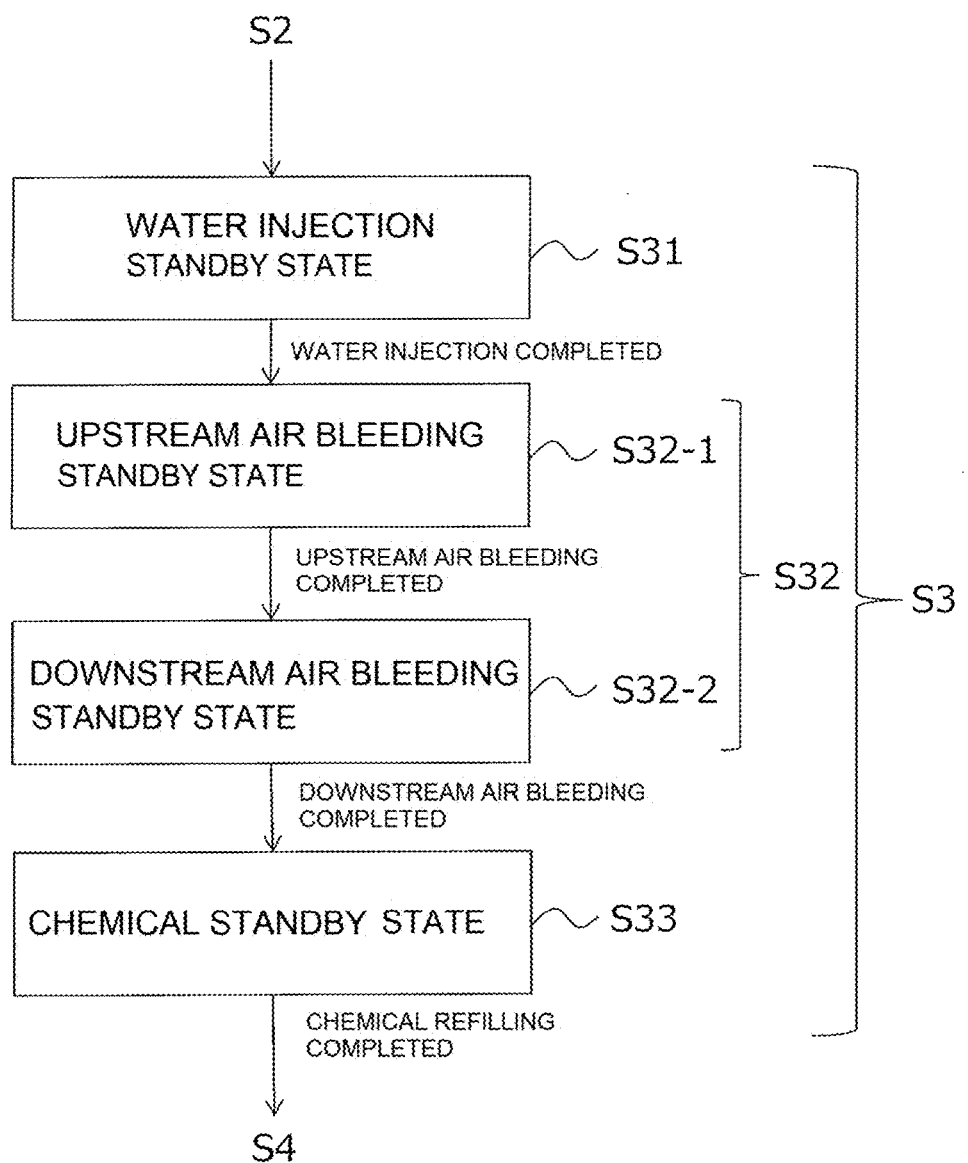
FIG. 12 is a schematic state transition diagram relating to a chemical refilling to which the drone system mentioned above transitions.

As illustrated in FIG. 12, the chemical preparation state (S3) includes a water injection standby state (S31), an air bleeding standby state (S32), and a chemical standby state (S33).

The water injection standby state (S31) is a state in which water can be injected into the chemical tank 104. The water injection standby state (S31) is a state to transition from the chemical preparation standby state (S2) based on the chemical injection start command from the user. In the water injection standby state (S31), the drone system 500 notifies the user 402 through the remote controller 401 that water needs to be injected into the chemical tank 104. The drone 100 may also determine whether the chemical tank 104 is filled with a sufficient amount of water by the refilling detection unit 33. In this case, the drone system 500 notifies the user through the remote controller 401 that the chemical tank 104 is filled with sufficient water.

In addition, the drone system 500 notifies the user 402 through the remote controller 401 to close the lid of the chemical tank 104 or to lock the lid after the injection is completed. The opening and closing of the lid and the locking and unlocking of the lock may be automatically performed by the mechanism provided in the drone 100, respectively.

In the water injection standby state (S31), when the water injection detection unit 31 detects that water has been injected into the chemical tank 104, the drone system 500 transitions to the air bleeding standby state (S32). The drone system 500 refers to the determination result of the opening/closing sensor 104a and transitions to the air bleeding standby state (S32) on a condition that the lid of the chemical tank 104 is closed or further locked by an appropriate locking mechanism.

The air bleeding standby state (S32) drives the pump 106 to bleed air and waits for air to escape from inside of the chemical tank 104 and from the chemical tank 104 to the chemical nozzles 103-1 to 4. The air bleeding standby state (S32) also has the upstream air bleeding standby state (S32-1) and the downstream air bleeding standby state (S32-2).

In the upstream air bleeding standby state (S32-1), the three-way valve 122 is open to a side of the expansion tank 131. The air present in the chemical tank 104 and in the upstream path is circulated this path, and temporarily stored and removed into the expansion tank 131 by driving the pump 106. When the air bleeding detection unit 32 detects the completion of the air bleeding operation on the upstream route, the drone system 500 transitions to the downstream air bleeding standby state (S32-2).

In the downstream air bleeding standby state (S32-2), the three-way valve 122 is open to a side of the chemical nozzles 103-1 to 4. The air mainly present in the downstream path is pushed by water that moves by driving the pump 106 and discharged from the nozzle 103 to the outside of the chemical tank 104. In other words, an air bleeding of the chemical tank 104 in the downstream route is performed. When the air bleeding detection unit 32 detects the completion of the air bleeding operation, the drone system 500 transitions to the chemical standby state (S33).

The upstream air bleeding standby state (S32-1) and the downstream air bleeding standby state (S32-2) fully automatically transitions, and there may be no condition based on the action of the user 402, but the remote controller 401 may notify that the transition from the upstream air bleeding standby state (S32-1) to the downstream air bleeding standby state (S32-2) is made and the state may transition based on a confirmation input of the user 402. Further, when the state fully automatically transitions, it may be configured to notify the user 402 through the remote controller 401 which state the drone system 500 is in.

The chemical standby state (S33) is a state in which the lid of the water injection port is unlocked and the chemicals can be injected from the water injection port. In the chemical standby state (S33), the drone system 500 notifies the user 402 through the remote controller 401 that the chemicals need to be injected into the chemical tank 104. The drone system 500 determines that the chemical tank 104 is filled with a sufficient amount of the chemicals by the refilling detection unit 33 and notifies the user 402 through the remote controller 401.

Furthermore, the drone system 500 may notify the user through the remote controller 401 to close the lid of the chemical tank 104 or to lock the lid after the injection is completed.

When the refilling detection unit 33 detects that the chemical tank 104 has been refilled with the chemicals, the drone system 500 transitions to the flight start standby state (S4).

As mentioned above, the drone 100, which is sprayed in the air, can spray the chemicals precisely on the farm field, so compare to general chemicals sprayed on a ground by a ground sprayer or a user himself, the chemical with a higher concentration is loaded. In other words, it becomes more expensive and may be harmful to the human body and the farm field compared to general chemicals. Therefore, discharging the chemicals by the air bleeding operation is not preferable in terms of cost and safety. According to the configuration in which the air bleeding operation is performed with water and then the chemical is refilled, the amount of the chemicals discharged from the nozzle 103 can be suppressed in the chemical preparation state (S3), so an application to the drone is especially useful.

The flight start standby state (S4) is a state in which the flight start command from the user 402 can be input. The flight start command is a command that the user 402 prompts the drone 100 to take off. As illustrated in FIG. 11, when the flight start command reception unit 51 receives the flight start command, the drone system 500 transitions to the takeoff diagnosis state (S5) to perform the necessary takeoff diagnosis before the drone 100 takes off.

The takeoff diagnosis state (S5) is a state to which the drone system 500 belongs while the drone 100 diagnoses whether the conditions for safe flight and application of the chemicals are prepared before the drone 100 begins flight and application of the chemicals.

Figure 13:
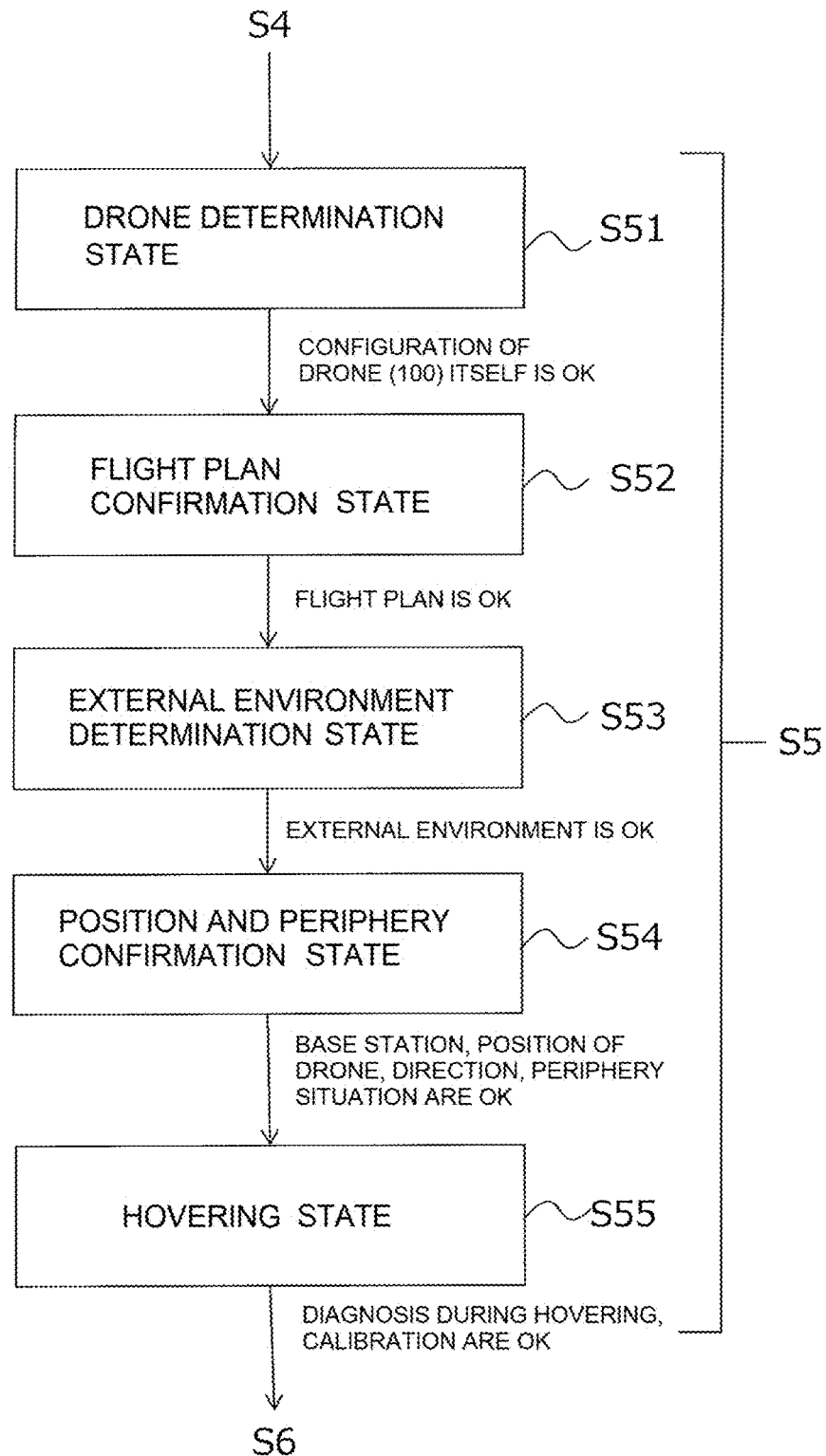
FIG. 13 is a schematic state transition diagram relating to a takeoff diagnosis to which the drone system mentioned above transitions.

As illustrated in FIG. 13, the takeoff diagnosis state (S5) includes a drone determination state (S51), a flight plan confirmation state (S52), an external environment determination state (S53), a position and peripheral confirmation state (S54), and a hovering state (S55). The drone determination state (S51), the flight plan confirmation state (S52), the external environment determination state (S53), and the position and peripheral confirmation state (S54) are states in which the drone 100 is landing, and the hovering state (S55) is a state in which the drone 100 has taken off and is hovering over the landing point 406.

The drone determination state (S51) is a state to which the drone system 500 belongs while the drone determination unit 53 determines that each configuration of the drone 100 itself is operating within the normal range. Further, in the drone determination state (S51), the airframe visual confirmation unit 59 prompts the user 402 to visually confirm the drone 100. When the drone determination unit 53 determines that each configuration is operating within the normal range, the drone system 500 transitions to the flight plan confirmation state (S52). When an abnormality is determined by the drone determination unit 53, the remote controller 401 displays that fact, and the system transitions to the after landing standby state (S7).

The flight plan confirmation state (S52) is a state to which the drone system 500 belongs while the flight plan confirmation unit 52 is checking whether the drone 100 normally retains an information related to the flight plan of the drone 100. When the information about the flight plan is confirmed, the drone system 500 transitions to the external environment determination state (S53). When the information related to the flight plan is not properly retained, the drone system 500 operates to get the information related to the flight plan. This operation may receive the information from, for example, the farming support cloud 405. Furthermore, when the user 402 needs to make a decision, such as designating the farm field to spray the chemicals, the remote controller 401 notifies the user 402 and prompts the decision.

The external environment determination state (S53) is a state to which the drone system 500 belongs while the external environment determination unit 54 mainly determines whether the external environment of the drone 100 is suitable for the flight of the drone 100. When the external environment determination unit 54 determines that the external environment is suitable for flight, the drone system 500 transitions to the position and peripheral confirmation state (S54).

When the external environment determination unit 54 determines that the external environment is not suitable for the flight of the drone 100, the drone 100 stands by while landing. In addition, the remote controller 401 indicates that fact. Since the external environment is a factor that fluctuates rapidly in a short period of time, it is preferable to wait for the external environment to become suitable for flight rather than transitioning to another state.

The position and peripheral confirmation state (S54) is a state to which the drone system 500 belongs while positions and directions of the base station position confirmation unit 55, the airframe position confirmation unit 56, the nose confirmation unit 57, the peripheral confirmation unit 58, the base station 404, and the drone 100, and a surrounding environment of the drone 100 are confirmed.

When the position and direction of the base station 404 and the drone 100 and the surrounding environment of the drone 100 are confirmed in the position and peripheral confirmation state (S54), the drone 100 takes off and the drone system 500 transitions to the hovering state (S55).

The hovering state (S55) is a state to which the drone system 500 belongs while the flight preparation unit 60 diagnoses and prepares the drone 100 for a safe flight with the horizontal displacement. In the hovering state (S55), the strong wind diagnosis unit 61 diagnoses whether the wind blowing on the drone 100 is sufficient to allow the drone 100 to fly. Diagnosing the strong wind may be performed by the external environment determination unit 54. The propulsion diagnosis unit 62 determines whether the rotor blade 101 exerts the desired thrust. The calibration unit 63 calibrates at least one of a sensor for measuring the altitude of the drone 100 and a sensor for measuring the velocity of the drone 100. The weight estimation unit 64 estimates the weight of the drone 100.

The above preparations performed in the hovering state (S55) is essential or easy processes to measure when the drone 100 is in the air. However, these preparations may be configured to be made during landing. For example, the offset of the sensor for measuring the altitude of the drone 100 and the offset of the sensor for measuring the speed of the drone 100 can be calibrated even during landing. Further, the judgments and confirmations made in the drone determination state (S51), the flight plan confirmation state (S52), and the external environment determination state (S53) may be made during hovering rather than during landing. In particular, during hovering, it may be determined whether there are a sufficient number of satellites for which the GPS communication has been established. Furthermore, it may also be done both during landing and hovering.

In addition to the above description, in the takeoff diagnosis state (S5), the drone system 500 may prompt the confirmation by the user 402 and make it one condition of the state transition to input the information that the user 402 has confirmed.

The drone system 500 may confirm the power capacity of the emergency remote controller in the takeoff diagnosis state (S5). This is because if the power capacity of the emergency remote controller is less than the predetermined value, the emergency stop command cannot be transmitted in the flight spraying state (S6) and it may compromise safety. If the power capacity of the emergency remote controller is less than or equal to the predetermined value, the system indicates this fact to the remote controller 401 and encourages the user 402 for replacing the battery of the emergency remote controller or for other actions. In addition, the same applies to the power capacity of the remote controller 401 itself.

In the present embodiment, the drone system 500 transitions to the drone determination state (S51) when the flight start command is received, transitions to the flight plan confirmation state (S52) when the drone determination state (S51) determines that the state of the drone 100 itself is within the normal range, transitions to the external environment determination state (S53) when the flight plan confirmation state (S52) determines that the flight plan is stored in the flight plan confirmation unit 52, transitions to the position and peripheral confirmation state (S54) when the external environment determination state (S53) determines that the external environment is suitable for the flight of the drone 100, takes off and transitions to the hovering state (S55) when the position and peripheral confirmation state (S54) determines the position and the direction of the base station 404 and the drone 100 and determines the surrounding environment of the drone 100, and transitions to the flight spraying state (S6) to start the flight with the horizontal displacement when each diagnosis and calibration is performed normally in the hovering state (S55). The order of the drone determination state (S51), the flight plan confirmation state (S52), the external environment determination state (S53), and the position and peripheral confirmation state (S54) is random. In addition, the flight plan confirmation state (S52) may not be there.

When the drone system 500 receives the flight start command, the system makes the drone 100 to take off at least after transitioning to the takeoff diagnosis state (S5). By having the takeoff diagnosis state (S5) after the flight start command and immediately before takeoff, it is possible to reliably detect abnormalities that occurred during other operations such as a chemical injection, so at a different timing. Higher level of safety can be ensured as compared with the configuration with diagnosis and the configuration without diagnosis, so higher level of safety can be ensured compared to configurations that perform diagnosis at different timings and configurations that do not perform diagnosis.

After transitioning to the hovering state (S55), the drone system 500 makes the drone 100 to start flying with the horizontal displacement after the take off. A configuration that includes processes of diagnosing and calibrating the drone 100 during hovering prior to the start of the horizontal displacement allows for safer and more accurate chemical spraying.

The flight spraying state (S6) is a state to which the drone system 500 belongs while the drone 100 is flying and spraying the chemicals on the farm field. The flight spraying state (S6) includes flight with the horizontal displacement of the drone 100. In addition, it may be hovering during the flight spraying state (S6). During hovering in the flight spraying state (S6), the diagnosis and the calibration described in the hovering state (S55) may be performed. In this diagnosis, when a strong wind is blowing on the drone 100, the drone 100 performs a retreat action described later. Further, the drone 100 may perform the retreat action when the thrust by the motor 102 and the rotor blade 101 is not within a desired range. During hovering in the flight spraying state (S6), when a deviation between the true value and the measured value is detected by calibration, each value is calibrated and the flight is continued. Furthermore, the weight is estimated during hovering in the flight spraying state (S6). Since the chemicals are sprayed in the flight spraying state (S6), the weight of the drone 100 changes according to the spraying. Therefore, a value of the weight estimated during hovering in the flight spraying state (S6) may be used to estimate the amount of the chemicals in the chemical tank 104. When the drone 100 lands, the system transitions to the after landing standby state (S7).

When the emergency stop command is sent by the remote controller 401 or the emergency remote controller in the flight spraying state (S6), the drone 100 takes the retreat action. The retreat action includes, for example, an "emergency return" that immediately travels to a predetermined returning point by a shortest route. The predetermined returning point is a point stored in the flight control unit 23 (the flight controller 501) in advance, for example, the landing point 406. The landing point 406 is, for example, a landing point where the user 402 can approach the drone 100, and the user 402 can inspect the drone 100 when it reaches the landing point 406, or manually take it to another place.

Further, the retreat action includes a landing operation. "The landing operation" includes "a normal landing" which is a normal operation for landing, "an emergency landing" which descends and lands faster than the normal landing, and "an emergency stop" which stops all the rotor blades and makes the drone 100 to drop down from the spot. "The emergency landing" includes not only an operation to descend faster than the normal landing and land at the same point as when performing the normal landing while performing a posture control similar to a normal time but also an operation to establish landing while slightly losing the posture due to a poor accuracy of the posture control. As a specific example, by slowly and evenly reducing the rotation speed of all motors, it is possible to land while descending accurately, although not directly below.

The drone 100 receives the power capacity of the remote controller 401 from the remote controller 401, at least in the flight spraying state (S6). The drone 100 takes the retreat action when the power capacity of the remote controller 401 is less than or equal to a predetermined value. When the power capacity of the remote controller 401 is low, the flight command of the user 402 cannot be transmitted to the drone 100 and it becomes difficult for the drone 100 to fly safely. Therefore, when the power capacity of the remote controller 401 is low, it is advisable to have the drone 100 take the retreat action even if the battery 502 of the drone 100 has sufficient capacity.

Similarly, when the power capacity of the emergency remote controller is less than the predetermined value, it is advisable to have the drone 100 take the retreat action.

The drone system 500 transitions to the emergency stop state (S11) when it receives the emergency stop command from the remote controller 401 or the emergency remote controller. The drone system 500 receives the emergency stop command and sends the receipt information to the remote controller 401 that it has transitioned to the emergency stop state (S11). According to this configuration, from the display of the remote controller 401, the user 402 can know that the drone system 500 has transitioned to the emergency stop state (S11) as the user 402 intended.

The after landing standby state (S7) is a state to which the drone system 500 belongs while preparing to switch operation after landing. The after landing standby state (S7) is the state in which the drone 100 can transition to multiple states based on the operation command from the user 402 while the drone 100 is landing.

In the after landing standby state (S7), when the system receives an operation command from the user 402 to switch the farm field for spraying the chemicals, the drone system 500 transitions to the flight start standby state (S4) via a designated farm field switching route (D).

In the after landing standby state (S7), when an operation command for maintenance is received from the user 402, the drone system 500 transitions to the maintenance state (S8).

In the after landing standby state (S7), when an operation command to perform the chemical refilling is received from the user 402, the drone system 500 transitions to the chemical preparation standby state (S2).

According to the drone system 500 with the after landing standby state (S7), when the drone 100 finishes spraying the chemicals on one of the farm fields and continues to spray the chemicals or the chemical refilling on another the farm field, the next operation can be smoothly performed. Specifically, when switching the farm field and performing the chemical refilling, it is possible to directly transition to the flight start standby state (S4) and the chemical preparation standby state (S2) without going through other states, such as the shutdown state (S9), the stop state (S0), and the initial check state (S1).

The maintenance state (S8) is a state to which the drone system 500 belongs while the drone 100 is performing maintenance on the drone 100 itself. Maintenance includes, for example, the operation of automatically cleaning the outer housing of the drone 100. When the maintenance in the maintenance state (S8) is completed, the drone system 500 transitions to the shutdown state (S9).

The shutdown state (S9) is the state to which the drone system 500 belongs until the drone 100, the remote controller 401, and the base station 404 are disconnected from each other and the drone 100, the remote controller 401, and the base station 404 are powered down.

Figure 14:
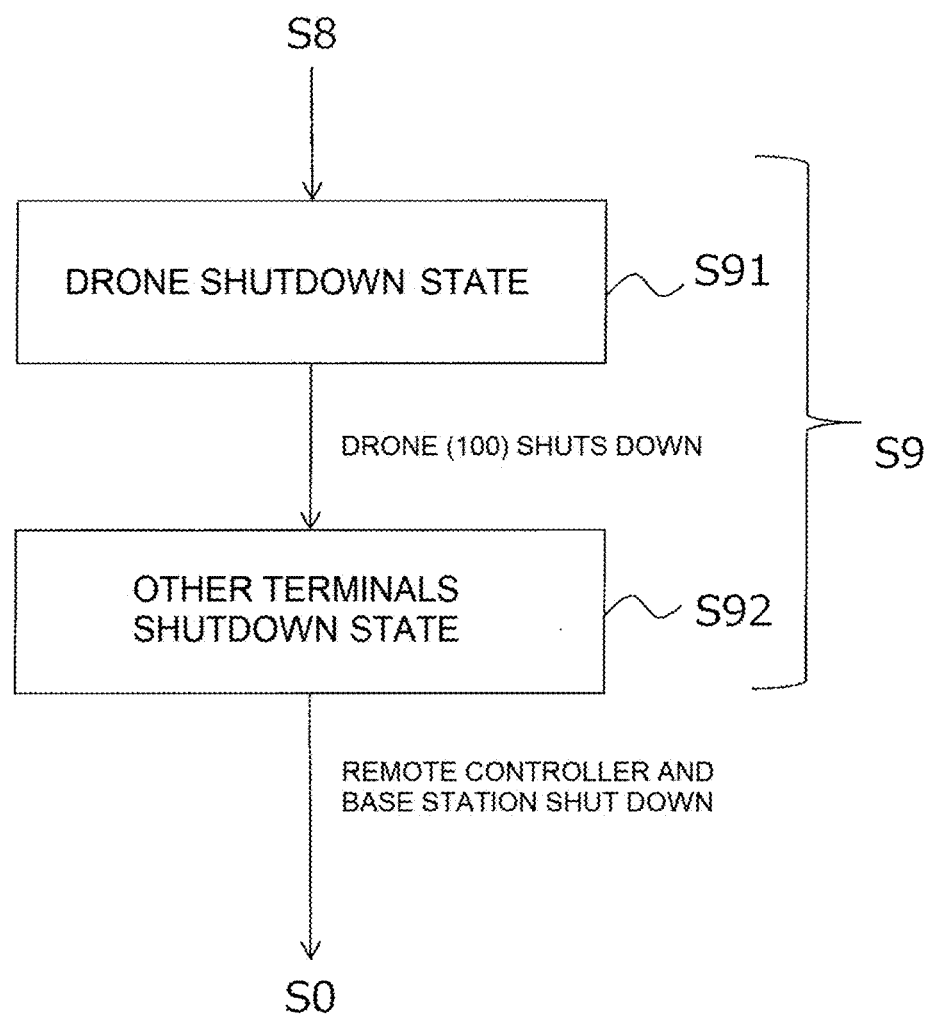
FIG. 14 is a schematic state transition diagram relating to shut down of the drone system above mentioned to which the drone system mentioned above transitions.

As illustrated in FIG. 14, the shutdown state (S9) includes the drone shutdown state (S91) and the other terminals shutdown state (S92).

The drone shutdown state (S91) is a state to which the drone system 500 belongs until the drone 100 makes necessary preparations for shut down, or the power to be turned off, and the drone 100 shuts down. In the drone shutdown state (S91), the drone 100 stores the information stored in the first state storage unit 115 in a non-volatile storage unit. In addition, the drone 100 transmits the information stored in the first state storage unit 115 to the farming support cloud 405 by the first state transmission unit 111.

The drone 100 disconnects from the remote controller 401 and the base station 404 and end the cooperation with each component. Then, the drone 100 is shut down.

When the drone 100 is shut down, the drone system 500 transitions to the other terminals shutdown state (S92). Here, when the drone 100 is a main terminal, the main terminal transitions to another component, for example, the remote controller 401, upon the shutdown of the drone 100.

For the transition of the main terminal, the remote controller 401 may be determined as the main terminal by the first main terminal determination unit 114 before shutting down the drone 100. Further, the second main terminal determination unit 414 may detect that the drone 100 is turned off and determine the remote controller 401 as the main terminal.

The other terminals shutdown state (S92) is a state to which the drone system 500 belongs until the remote controller 401 and the base station 404 shut down. The remote controller 401 and the base station 404 may respectively transmit the information stored in the second and third state storage units 415 and 445 to the farming support cloud 405 by the second and third state transmission units 411 and 441.

When the drone 100, the remote controller 401 and the base station 404 are all shut down, the drone system 500 stops. In other words, the drone system 500 transitions to the stop state (S0).

When the chemical preparation state (S3) or the takeoff diagnosis state (S5) detects that the battery capacity of the drone 100 is below a predetermined level, the drone system 500 transitions to the after landing standby state (S7) via a dead battery route (C). When the battery capacity is below the predetermined value in the after landing standby state (S7), the drone system 500 transitions to the shutdown state (S9) and the battery 502 becomes replaceable.

When the chemical preparation state (S3) or the after landing standby state (S7) detects that the chemicals in the chemical tank 104 is below the predetermined level, the drone system 500 transitions to the chemical preparation standby state (S2) via a chemical shortage route (B). In the chemical preparation state (S3), or the state that the drone is landing, when the chemicals in the chemical tank 104 are detected to be below the predetermined level, the system can transition to the chemical preparation standby state (S2) before takeoff. In the chemical preparation state (S3), when the chemical tank 104 contains enough chemicals, it is likely to be chemical shortage in the flight spraying state (S6) of the drone 100. Therefore, the drone 100 lands from the flight spraying state (S6), transitions to the after landing standby state (S7), and then transitions to the chemical preparation standby state (S2). In this way, the drone system 500 can detect the chemical shortage and transition from two different states to the chemical preparation standby state (S2), so even if the chemicals run out, it can transition smoothly to the next state without a redundant state transition.

The drone system according to the present invention, in which a drone, a remote controller, a base station, and a farming support cloud, are connected to each other and cooperate to operate, can maintain the state of the drone system and smoothly continue the operation as the drone system although a connection between one of the components and other components is broken, or one of the components is powered off.

In this specification, a chemical spraying drone for an agricultural use has been described as an example, but the technical idea of the present invention is not limited to this and can be applied to all drones. In particular, it is applicable to drones that fly autonomously.

(Technical Remarkable Effect of the Invention)

In the drone system according to the present invention, it is possible to provide a drone system that can maintain high level of safety even during autonomous flight.

[Additional Remarks]

Additional remarks of other structural features and effects thereof in the above-described embodiment of the present invention will be described below.

The drone determination unit 53 may compare the posture with a direction of a gravitational acceleration vector and determine whether it is within a predetermined range. The posture is, for example, a roll angle and a pitch angle.

The external environment determination unit 54 may check whether the reception sensitivity of the GNSS signal is sufficient. In addition, the external environment determination unit 54 may also check if the GNSS Doppler speed is being received. Furthermore, the external environment determination unit 54 may check whether a RTK-GNSS is fixed, in other words, confirmed.

The external environment determination unit 54 may check if the GNSS compass is fixed, in other words, confirmed. The external environment determination unit 54 may also check if data has arrived from the GNSS module.

The drone determination unit 53 may check whether a distance between the base station 404, which cooperate to operate, and the drone 100 is within a predetermined range.

The drone determination unit 53 may check whether the sensor mounted on the drone 100 can communicate normally with the flight controller 501. For example, the drone determination unit 53 checks whether it can communicate normally with the acceleration sensor, the angular velocity sensor (the acceleration sensor and the angular velocity sensor is included in the six-axis gyro sensor 505), the barometric pressure sensor 507, and the geomagnetic sensor 506.

The drone determination unit 53 may check whether a difference between each of the multiplexed sensors is within a predetermined range. For example, a difference between the values of the main sensor and the sub sensor may be calculated for each XYZ direction of the acceleration sensor and checked whether the values are within a predetermined range. In addition, a difference between the measured values of a main sensor and a sub sensor of the barometric pressure sensor may be checked whether the values are within a predetermined range. Further, a difference between the values of the main sensor and the sub sensor may be calculated for each XYZ (roll, pitch, and yaw) direction of the angular velocity sensor and checked whether the values are within a predetermined range.

The drone determination unit 53 or the external environment determination unit 54 may check the value of the acceleration sensor in at least one of the landing state and the hovering state. For example, the values of the main acceleration sensor in the X and Y directions are checked if they are within the predetermined range. If it exceeds the predetermined value, it is possible that the sensor is abnormal, the range setting of the sensor is abnormal, or the drone 100 is placed on an inclined position, and normal takeoff may be difficult. In addition, the value of the main acceleration sensor in the Z direction is checked if it is within the predetermined range. If it exceeds the predetermined range, it is possible that the sensor is abnormal, the range setting of the sensor is abnormal, or the drone 100 is extremely tilted, and the normal takeoff may be difficult.

The drone determination unit 53 or the external environment determination unit 54 may check whether the angular velocity is within a predetermined value in the XYZ direction of the angular velocity sensor in at least one of the landing state and the hovering state. If it exceeds the predetermined value, the drone 100 may rotate or a large bias may occur.

The drone determination unit 53 or the external environment determination unit 54 may check whether an altitude calculated from the barometric pressure sensor 507 is within a predetermined range. If it exceeds the predetermined range, there is a possibility that the barometric pressure sensor 507 is abnormal or the drone 100 is placed at a high altitude that is not suitable for flight.

The drone determination unit 53 or the external environment determination unit 54 may check whether the magnitude of the geomagnetic sensor vector is within a predetermined range. If it exceeds the predetermined value, there is a possibility that the geomagnetic sensor 506 is abnormal, the range setting of the magnetic sensor 506 is abnormal, or the drone 100 is placed in a strong magnetic environment that is not suitable for flight.

The drone determination unit 53 may check whether the estimated value of the velocity vector is within a predetermined value.

The drone determination unit 53 may check whether the battery 502 is properly installed. The drone determination unit 53 may check whether the battery level is above a predetermined level.

The drone determination unit 53 may check whether two of the batteries 502 are installed and the flight controller 501 can communicate with two of the batteries 502 when the battery 502 is duplicated. In addition, it is possible to check whether battery levels of two of the batteries 502 are within a predetermined level. Further, it is also possible to check whether a voltage difference of two of the batteries 502 is within a predetermined range. Furthermore, it is possible to check whether levers to secure two of the batteries 502 to the body are locked.

The drone determination unit 53 may check the configuration related to the chemical spraying, such as, a spraying system. For example, it is possible to check whether the chemical tank 104 is filled with sufficient chemicals. Further, it is also possible to check whether the configurations of the spraying system, such as the pump 106, the three-way valve 122, and the chemical nozzles 103-1, 103-2, 103-3, 103-4, can communicate with the flight controller 501.

The drone 100 has a storage to record the operation logs. The drone determination unit 53 may check if there is more than a predetermined amount of free space in a logging area.

The invention claimed is:

1. A drone system comprising a remote controller and a drone, being connected to each other through a network and cooperating to operate;
wherein the drone comprising:
a processor, which when executing at least one program, configures the processor to:
receive a flight start command from a user;
determine whether a configuration of the drone itself is operating within a normal range; and
determining whether an external environment of the drone is suitable for a flight of the drone,
wherein the drone system has a plurality of states different from each other including at least a takeoff diagnosis state, and the drone system satisfies a condition determined for each state to transition to another state corresponding the condition,
wherein in the takeoff diagnosis state, the processor is configured to:
determine the configuration of the drone itself; and
determine the external environment; and
cause the drone to takeoff after transitioning to the takeoff diagnosis state upon receiving the flight start command,
wherein the drone system further comprising an emergency remote controller transmitting an emergency stop command to the drone, and the drone system confirms a power capacity of the emergency remote controller in the takeoff diagnosis state and notifies when the power capacity of the emergency remote controller is less than or equal to a predetermined value.

2. The drone system according to claim 1, wherein the processor is configured to determine the configuration of at least one of a battery, a motor, and a sensor.

3. The drone system according to claim 1, wherein the processor is configured to determine the external environment of the drone based on at least one of a presence or an absence of a disturbance that interferes with radio waves connecting the drone and the remote controller, GPS reception sensitivity, temperature, wind speed around the drone, weather, and geomagnetic situation.

4. The drone system according to claim 3, wherein the processor is configured to confirm a power capacity of the remote controller in the takeoff diagnosis state and notify when the power capacity of the remote controller is less than or equal to a predetermined value.

5. The drone system according to claim 1, wherein the processor is configured to cause the drone to wait while landing when it is determined that the external environment is not suitable for the flight of the drone.

6. The drone system according to claim 1, wherein the processor is configured to confirm a power capacity of the remote controller in the takeoff diagnosis state and notify when the power capacity of the remote controller is less than or equal to a predetermined value.

7. The drone system according to claim 1, wherein the drone system transitions to the drone determination state when the flight start command is received, transitions to the external environment determination state when a condition of the drone itself is determined within a normal range in the drone determination state, and makes the drone to start a takeoff operation when the external environment is determined to be suitable for the flight of the drone in the external environment determination state.

8. The drone system according to claim 1, wherein the drone further comprising a flight plan storage unit storing an information related to a flight plan of the drone, and wherein the plurality of states further includes a flight plan confirmation state confirming the information related to the flight plan stored in the flight plan storage unit.

9. The drone system according to claim 8, wherein the drone system transitions to the drone determination state when receiving the flight start command, transitions to the flight plan confirmation state when a condition of the drone itself is determined within a normal range in the drone determination state, transitions to the external environment determination state when it is confirmed that the flight plan is stored in the flight plan storage unit in the flight plan confirmation state, and makes the drone to start a takeoff operation when the external environment is determined to be suitable for the flight of the drone in the external environment determination state.

10. The drone system according to claim 1, wherein the processor is configured to operate during hovering of the drone, and wherein the plurality of states further includes a hovering state in which the processor diagnoses a condition of the drone during hovering.

11. The drone system according to claim 10, wherein the hovering state diagnoses at least one of wind speed around the drone, and thrusts of the drone by a propulsion device.

12. The drone system according to claim 10, wherein the processor is configured to calibrate at least one of a sensor measuring altitude of the drone and a sensor measuring speed of the drone, and calibrate in the hovering state.

13. The drone system according to claim 10, wherein the processor is configured to estimate a weight of the drone, and estimate the weight of the drone in the hovering state.

14. The drone system according to claim 10, wherein the drone system starts a flight accompanied by a horizontal displacement of the drone after transitioning to the hovering state.

15. The drone system according to claim 1, wherein the processor is configured to perform at least one of: confirming a position of a base station being connected to each other through the drone and the network to cooperate to operate; confirming a position of the drone; confirming a direction of a nose of the drone;
confirming whether there are obstacles around the drone; and prompting the user to visually confirm whether the drone is normal.

16. A method for controlling a drone system, comprising a remote controller and a drone being connected to each other through a network and cooperating to operate, the method comprising the steps of:
receiving a flight start command from a user;
determining whether a configuration of the drone itself is operating within a normal range; and
determining whether an external environment of the drone is suitable for a flight of the drone,
wherein the drone system has a plurality of states different from each other including at least a takeoff diagnosis state, and the drone system satisfies a condition determined for each state to transition to another state corresponding the condition,
wherein in the takeoff diagnosis state, the method comprises the steps of:
determining the configuration of the drone itself; and
determining the external environment; and
the method further comprising the steps of:
receiving the flight start command;
transitioning to the takeoff diagnosis state based on the flight start command; and
making the drone to takeoff after transitioning to the takeoff diagnosis state,
wherein the drone system further comprising an emergency remote controller transmitting an emergency stop command to the drone, and the drone system confirms a power capacity of the emergency remote controller in the takeoff diagnosis state and notifies when the power capacity of the emergency remote controller is less than or equal to a predetermined value.

17. A non-transitory computer-readable storage medium that stores a computer-executable program for controlling a drone system, comprising a remote controller and a drone being connected to each other through a network and cooperating to operate the program performing the steps of:
receiving a flight start command from a user;
determining whether a configuration of the drone itself is operating within a normal range; and
determining whether an external environment of the drone is suitable for a flight of the drone;
wherein the drone system has a plurality of states different from each other including at least a takeoff diagnosis state, and the drone system satisfies a condition determined for each state to transition to another state corresponding the condition,
wherein the takeoff diagnosis state comprises the steps of:
determining the configuration of the drone itself; and
determining the external environment; and
the program further performing the steps of:
receiving the flight start command;
transitioning to the takeoff diagnosis state based on the flight start command; and
making the drone to takeoff after transitioning to the takeoff diagnosis state,
wherein the drone system further comprising an emergency remote controller transmitting an emergency stop command to the drone, and the drone system confirms a power capacity of the emergency remote controller in the takeoff diagnosis state and notifies when the power capacity of the emergency remote controller is less than or equal to a predetermined value.

* * * * *